US012673789B2

(12) United States Patent     (10) Patent No.:   US 12,673,789 B2

Talke et al.     (45) Date of Patent:     Jul. 7, 2026

(54) AUTONOMOUS TETHER MANAGEMENT SYSTEM AND METHOD FOR AN UNMANNED AERIAL AND SURFACE VEHICLE TEAM

(71) Applicant: USA as Represented by the Secretary of the Navy, Arlington, VA (US)

(72) Inventors: Kurt Arthur Talke, San Diego, CA (US); Frederick Christopher Birchmore, La Mesa, CA (US); Nicholas Charles Stroumtsos, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 349 days.

(21) Appl. No.: 18/463,137

(22) Filed: Sep. 7, 2023

(65) Prior Publication Data

US 2024/0400236 A1     Dec. 5, 2024

Related U.S. Application Data

(60) Provisional application No. 63/505,377, filed on May 31, 2023.

(51) Int. Cl.
    *B64U 10/60*       (2023.01)
    *B64U 70/93*       (2023.01)

(52) U.S. Cl.
    CPC ............. *B64U 10/60* (2023.01); *B64U 70/93* (2023.01); *B64U 2201/104* (2023.01)

(58) Field of Classification Search
    CPC .................................................... B64U 10/60
    See application file for complete search history.

(56) References Cited

U.S. PATENT DOCUMENTS

| | | | |
|---|---|---|---|
| 2,451,244 A | 10/1948 | Rugg | ....................... B64D 3/00 |
| | | | 33/300 |
| 2,453,857 A | 11/1948 | Platt | ......................... B64F 1/04 |
| | | | 244/154 |

(Continued)

FOREIGN PATENT DOCUMENTS

| | | | |
|---|---|---|---|
| EP | 3729220 | * | 11/2018 |
| RU | 2441809 C2 | | 2/2012 |

(Continued)

OTHER PUBLICATIONS

Kosarnovsky and S. Arogeti, A String of Tethered Drones—System Dynamics and Control, IEEE.*

(Continued)

*Primary Examiner* — Jean Paul Cass

(74) *Attorney, Agent, or Firm* — Naval Information Warfare Center, Pacific; Kyle Eppele; Paul C. Oestreich

(57)        ABSTRACT

The present invention involves systems and methods for tether length management between an unmanned aerial vehicle (UAV), e.g., a drone, and a surface vehicle (SV), dynamically moving ground vehicle or an unmanned SV (USV) base station. The tether length control methodology of the present invention allows for a dynamic moving base station and maintains minimal tether tension, while measuring those dynamic oscillations of the UAV and SV. This novel slack tether tension management ultimately reduces forces and power consumption. A key feature of the present invention is the capability to de-couple the UAV's motion from the base/winch/SV. This enables operation in highly dynamic environments, e.g., maritime, moving ground vehicles, etc.

23 Claims, 17 Drawing Sheets

(56)         References Cited

U.S. PATENT DOCUMENTS

| | | | | |
|---|---|---|---|---|
| 4,500,056 | A | 2/1985 | Della-Moretta ... | B62D 53/0864 244/137.4 |
| 5,338,199 | A | 8/1994 | Euer ................. | F41J 9/10 434/14 |
| 7,149,611 | B2 | 12/2006 | Beck et al. | |
| 7,263,939 | B1 | 9/2007 | Phillips ................. | B64C 37/02 114/102.16 |
| 8,646,719 | B2 * | 2/2014 | Morris ................. | B64C 19/00 244/1 TD |
| 9,302,770 | B2 * | 4/2016 | Burgess ................. | B64D 1/12 |
| 9,688,404 | B1 | 6/2017 | Buchmueller ........... | B64D 1/12 |
| 10,399,704 | B2 | 9/2019 | Briggs, IV et al. | |
| 11,193,556 | B1 | 12/2021 | Endebrock ........... | F16H 57/021 |
| 11,254,446 | B2 | 2/2022 | Ratajczak ............. | B64D 31/00 |
| 11,423,790 | B2 | 8/2022 | Yu et al. | |
| 11,440,680 | B2 | 9/2022 | Talke et al. | |
| 11,603,193 | B2 * | 3/2023 | Kim ................. | B64U 50/19 |
| 11,603,198 | B2 * | 3/2023 | Kasai ................. | G06Q 10/04 |
| 2005/0017129 | A1 | 1/2005 | McDonnell ............. | B64D 3/00 244/110 G |
| 2008/0108273 | A1 | 5/2008 | Alden ................. | G09F 19/08 446/34 |
| 2012/0091259 | A1 * | 4/2012 | Morris ................. | B64C 19/00 244/17.11 |
| 2013/0043450 | A1 | 2/2013 | Kommer ................. | B66D 3/10 254/391 |
| 2013/0233964 | A1 | 9/2013 | Woodworth et al. | |
| 2016/0083115 | A1 | 3/2016 | Hess | |
| 2016/0144958 | A1 | 5/2016 | Woodworth et al. | |
| 2017/0240277 | A1 | 8/2017 | Molnar ................. | B64F 3/02 |
| 2017/0259941 | A1 | 9/2017 | Briggs, IV et al. | |
| 2017/0327091 | A1 | 11/2017 | Capizzo ................. | H02J 7/0013 |
| 2018/0072404 | A1 * | 3/2018 | Prager ................. | B64D 1/22 |
| 2018/0251216 | A1 | 9/2018 | Whitaker | |
| 2019/0071176 | A1 | 3/2019 | von Flotow ............. | B66D 1/46 |
| 2020/0225684 | A1 | 7/2020 | Anderson et al. | |
| 2021/0009285 | A1 | 1/2021 | Talke ................. | B64C 39/024 |
| 2021/0012163 | A1 | 1/2021 | Li ................. | G06V 20/17 |
| 2021/0027828 | A1 | 1/2021 | Yamazaki ........... | H01L 27/1251 |
| 2021/0129982 | A1 | 5/2021 | Collins et al. | |
| 2021/0171217 | A1 | 6/2021 | Brown ................. | B63G 11/00 |
| 2021/0241636 | A1 | 8/2021 | Yu ................. | B64C 39/022 |
| 2021/0354791 | A1 | 11/2021 | Sheldon-Coulson ... | F03B 13/14 |
| 2022/0208424 | A1 | 6/2022 | Matthews ................. | H01F 3/14 |
| 2022/0380186 | A1 | 12/2022 | Chao et al. | |

FOREIGN PATENT DOCUMENTS

| | | | | |
|---|---|---|---|---|
| WO | WO-2018165192 | A1 | 9/2018 | |
| WO | WO-2019067788 | A1 | 4/2019 | |
| WO | WO-2019126698 | A1 * | 6/2019 | .............. B66C 1/38 |
| WO | WO-2021126071 | A1 | 6/2021 | |

OTHER PUBLICATIONS

Amer et al., Self-Localization of Tethered Drones without a Cable Force Sensor in GPS-Denied Environments, Department of Mechanical and Aerospace Engineering, New Mexico State University, Las Cruces, NM 88003, USA, MDPI (2021).*

Davi Ferreira de Castro, Modeling and Control of Tethered Unmanned Multicopters in Hovering Flight AIAA Modeling and Simulation Technologies ConferenceAIAA AVIATION Forum 2015.*

Machine Translation of CN110072774B ( 2016).*

USPTO Notice of References Cited in U.S. Appl. No. 16/874,026.

Ahmed et al., "Backstepping-based Landing Control of a RUAV using Tether Incorporating Flapping Correction Dynamics", 2008 American Control Conference, Jun. 11-13, 2008.

Al-Radaideh et al., "Self-Localization of a Tethered Quadcopter Using Inertial Sensors in a GPS-Denied Environment", 2017 ICUAS, Jun. 13-16, 2017.

Borgese et al., "Tether-Based Localization for Cooperative Ground and Aerial Vehicles", IEEE Robotics and Automation Letters, vol. 7, No. 13, Jul. 2022.

De Castro et al., "Modeling and Control of Tethered Unmanned Multicopters in Hovering Flight", AIAA Aviation, Jun. 22-26, 2015.

Choi et al., "Tethered Aerial Robots using Contactless Power Systems for Extended Mission Time and Range", IEEE Explor, 978-1-4799-5776-7/14, pp. 912-916, 2014.

Galea et al., "Tethered flight control of a small quadrotor robot for stippling", 2017 IEEE/RSJ Intl. Conf. on Intelligent Robots and Systems, Sep. 24-28, 2017.

Kim et al., "On the Scheduling of Systems of UAVs and Fuel Service Stations for Long-Term Mission Fulfillment", J Intel Robot Syst (2013) 70:347-359, 2013.

Kiribayashi et al., "Position Estimation of Tethered Micro Unmanned Aerial Vehicle by Observing the Slack Tether", 2017 IEEE Intl Symposium on SSRR, pp. 159-165, Oct. 2017.

Kourani et al., "Bidirectional Manipulation of a Buoy With a Tethered Quadrotor UAV", 2021 IEEE 3rd IMCET, pp. 101-106, 2021.

Kourani et al., "Marine locomotion: A tethered UAV-Buoy system with surge velocity control", Robotics and Autonomous Systems, vol. 145, 103858, pp. 1-17, 2021.

Kourani et al., "Three-dimensional modeling of a tethered UAV-buoy system with relative-positioning and directional surge velocity control", Nonlinear Dyn, 111:1245-68, 2023.

Lupashin et al., "Stabilization of a Flying Vehicle on a Taut Tether using Inertial Sensing", 2013 IEEE/RSJ Intl Conf. on IROS, pp. 2432-2438, Nov. 2013.

Nicotra et al., "Nonlinear Control of a Tethered UAV: the Taut Cable case", CoRR, arXiv:1610.00348v1 [csSY], Oct. 2, 2016.

Nicotra et al., "Taut Cable Control of a Tethered UAV", 19th IFAC World Congress Proceedings Volumes, vol. 47, No. 3, pp. 3190-3195, Aug. 24-29, 2014.

Oh et al., "Approaches for a Tether-Guided Landing of an Autonomous Helicopter", IEEE Transactions on Robotics, vol. 22, No. 3, pp. 536-544, Jun. 2006.

Ouchi et al., "Control of Position and Attitude of the Tethered X4-Flyer", Proceedings of the 2014 IEEE/SICE Intl. Symposium on System Integration, pp. 706-711. Dec. 2014.

Papachristos et al., "The Power-Tethered UAV-UGV Team: A Collaborative Strategy for Navigation in Partially-Mapped Environments", 22nd Mediterranean Conf. on C. and A., 2014.

Sandino et al., "A Square-Root Unscented Kalman Filter for attitude and relative position estimation of a tethered unmanned helicopter", ICUAS, Jun. 9-12, 2015.

Sandino et al., "Advances in Modeling and Control of Tethered Unmanned Helicopters to Enhance Hovering Performance", J Intell Robot Syst vol. 73, No. 1, pp. 3-18, 2014.

Sandino et al., "On the Use of Tethered Configurations for Augmenting Hovering Stability in Small-size Autonomous Helicopters", J Intell Robot Syst, vol. 70, pp. 509-525, 2013.

Sandino et al., "Tether-guided landing of unmanned helicopters without GPS sensors", 2014 IEEE Intl Conference on Robotics and Automation, pp. 3096-3101, May 31-Jun. 7, 2014.

Schmidt et al., "Automatic Hover Control of an Unmanned Tethered Rotorplatform", Automatica, vol. 10, pp. 393-403, Pergamon Press, Great Britain, 1974.

Talke et al., "Autonomous hanging tether management and experimentation for an unmanned air-surface vehicle team", J Field Robotics, 39:869-887, 2022.

Talke et al., "Catenary Tether Shape Analysis for a UAV—USV Team", 2018 IEEE/RSJ International Conference on IROS, pp. 7803-7809, Oct. 1-5, 2018.

Talke et al., "Design and Parameter Optimization of a 3-PSR Parallel Mechanism for Replicating Wave and Boat Motion", 2019 ICRA, pp. 7955-7961, May 20-24, 2019.

Thrun et al., "Probabalistic Robotics", MIT Press, 2005.

Tognon et al., "Observer-Based Control of Position and Tension for an Aerial Robot Tethered to a Moving Platform", IEEE Robotics and Automation Letters, V. 1, No. 2, Jul. 2016.

Hoverfly Technologies, homepage, <https://hoverflytech.com/>.

(56)     References Cited

OTHER PUBLICATIONS

Dragonfly Pictures, Inc, DPI, UAV Systems, UMAR—Unmanned Multirotor Aerial Relay—DPI UAV Systems, webpage, <https://www.dragonflypictures.com/products/umar-tethered-uas/>.
Zikou et al., "The Power-over-Tether system for powering small UAVs: Tethering-Line Tension Control Synthesis", 23rd Mediterranean Conf. on Cntrl and Autom., Jun. 16-19, 2015.
Talke et al., "Autonomous Hanging Tether Management and Experimentation for a UAV-USV Team: Sea Trials", <https://proceedings-limerick.oceans2023.org/>, Jun. 8, 2023.

* cited by examiner

1

AUTONOMOUS TETHER MANAGEMENT SYSTEM AND METHOD FOR AN UNMANNED AERIAL AND SURFACE VEHICLE TEAM

CROSS-REFERENCE TO RELATED APPLICATIONS

This US Nonprovisional Patent Application claims benefit and priority to U.S. Provisional Patent Application No. 63/505,377, filed May 31, 2023, titled: "AUTONOMOUS HANGING TETHER MANAGEMENT SYSTEM AND METHOD FOR AN UNMANNED AIR AND SURFACE VEHICLE TEAM", now expired. This US Nonprovisional Patent Application is related to U.S. patent application Ser. No. 16/874,026, filed May 14, 2020, titled: "TETHER MANAGEMENT SYSTEM FOR A TETHERED UAV", now U.S. Pat. No. 11,440,680 B2, issued Sep. 13, 2022, which in turn claims benefit and priority to US Provisional Patent Application No. 62/872,170, filed Jul. 9, 2019, titled: "AUTONOMOUS TETHER MANAGEMENT SYSTEM FOR A SLACK HANGING TETHER FOR A UAV", now expired. The contents of all of the above-referenced patent applications are hereby incorporated by reference for all purposes.

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211589.

BACKGROUND OF THE INVENTION

Field of the Invention: The present invention relates generally to tethered unmanned aerial vehicles (UAVs). More particularly, the present invention relates to an UAV tethered to a surface vehicle (SV), tether management methods and systems. It will be understood that a SV in the context of this invention could be any kind of vehicle undergoing dynamic motion, e.g., and not by way of limitation, a manned SV, unmanned SV (USV), a small boat on open water, or even a ground vehicle on the back of a truck traversing a hilly road.

Description of Related Art: Tethered multi-rotor UAVs have become widely prevalent in the surveillance, communications, and first-responder communities and readily available in recent years due to a number of different commercially available products. The tether, acting as a power and data umbilical, allows a UAV to overcome its most significant limitation: short-duration missions often limited to less than 30 minutes, see, e.g., J. Kim, B. D. Song, and J. R. Morrison, "On the scheduling of systems of UAVs and fuel service stations for long-term mission fulfillment," Journal of Intelligent & Robotic Systems, vol. 70, pp. 347-359, April 2013. By not carrying a heavy power source, a UAV's payload capacity increases significantly and its endurance becomes essentially infinite, see, e.g., S. Y. Choi, B. H. Choi, S. Y. Jeong, B. W. Gu, S. J. Yoo, and C. T. Rim, "Tethered aerial robots using contactless power systems for extended mission time and range," in 2014 IEEE Energy Conversion Congress and Exposition (ECCE), pp. 912-916, September 2014; C. Papachristos and A. Tzes, "The power-tethered UAV-UGV team: A collaborative strategy for navigation in partially-mapped environments," in 22nd Mediterranean Conference on Control and Automation, pp. 1153-1158 June 2014 and L. Sandino, M. Bejar, K. Kondak, and A. Ollero, "Advances in modeling and control of tethered unmanned helicopters to enhance hovering performance," Journal of Intelligent & Robotic Systems, vol. 73, no. 1, pp. 3-18, 2014. Unfortunately, a tether conversely limits the mobility of the UAV and introduces the challenge of tether management. Tethered flight is also accompanied by some payload limitations as it introduces additional downward forces on the UAV due to tether weight and tension. These forces must be overcome by increasing UAV thrust, thereby potentially reducing the UAV payload capacity, available power budget, and limiting flight altitude.

Conventional tethered-UAV systems typically employ a taut tether management approach to avoid tether oscillations, see, e.g., G. Schmidt and R. Swik, "Automatic hover control of an unmanned tethered rotorplatform," Automatica, vol. 10, pp. 393-394, January 1974. Conventional tethered-UAV systems may further employ a taut tether management approach to improve flight stability, see, e.g., D. Ferreira de Castro, J. S. Santos, M. Batista, D. Antônio dos Santos, and L. C. Góes, "Modeling and control of tethered unmanned multicopters in hovering flight," in AIAA Modeling and Simulation Technologies Conference, American Institute of Aeronautics and Astronautics, June 2015; S. Lupashin and R. D'Andrea, "Stabilization of a flying vehicle on a taut tether using inertial sensing," in 2013 IEEE/RSJ International Conference on Intelligent Robots and Systems, pp. 2432-2438 November 2013; M. M. Nicotra, R. Naldi, and E. Garone, "Taut cable control of a tethered UAV," IFAC Proceedings Volumes, vol. 47, no. 3, pp. 3190-95, 2014, 19th IFAC World Congress; Y. Ouchi, K. Kinoshita, K. Watanabe, and I. Nagai, "Control of position and attitude of the tethered X4-Flyer," in 2014 IEEE/SICE International Symposium on System Integration, pp. 706-711, December 2014 and L. A. Sandino, M. Bejar, K. Kondak, and A. Ollero, "On the use of tethered configurations for augmenting hovering stability in small size autonomous helicopters," Journal of Intelligent & Robotic Systems, vol. 70, no. 1, pp. 509-525, 2013.

Conventional tethered-UAV systems may also employ a taut tether management approach to enhance landing capability, see, e.g., B. Ahmed and H. R. Pota, "Backstepping-based landing control of a RUAV using tether incorporating flapping correction dynamics," in 2008 American Control Conference, pp. 2728-2733 June 2008; S.-R. Oh, K. Pathak, S. K. Agrawal, H. R. Pota, and M. Garratt, "Approaches for a tether-guided landing of an autonomous helicopter," IEEE Transactions on Robotics, vol. 22, pp. 536-544, June 2006 and L. A. Sandino, D. Santamaria, M. Bejar, A. Viguria, K. Kondak, and A. Ollero, "Tether-guided landing of unmanned helicopters without GPS sensors," in 2014 IEEE International Conference on Robotics and Automation (ICRA), pp. 3096-3101 May 2014. Conventional tether management techniques typically rely on taut tether control to avoid tether oscillations, improve flight stability, or enhance landing capabilities. For example, convention approaches tethered UAV-SV systems may include the UAV maintaining tension, a tension monitoring tether management system that continuously reels in any slack, or a clutch-based tension system.

Such conventional tether systems neglect the reduced payload capacity and increased UAV thrust requirement by employing either no tether management while the UAV maintains tension with linear (see, e.g., Nicotra et al. above) and nonlinear flight controllers (see, e.g., M. M. Nicotra, R. Naldi, and E. Garone, "Nonlinear control of a tethered UAV: the taut cable case," CoRR, 2016) or by employing a tension-monitoring winch mechanism that continuously reels in any slack tether length, see, e.g., U.S. Pat. No. 10,399,704 B2 to Briggs, IV et al.

Generally, such conventional tether systems described above only consider a stationary base station, not a base station undergoing dynamic motion. The scenario of tethered UAVs with moving platforms has been considered but under taut conditions and with no experimental validation, see, e.g., M. Tognon, S. S. Dash, and A. Franchi, "Observer-based control of position and tension for an aerial robot tethered to a moving platform," IEEE Robotics and Automation Letters, vol. 1, pp. 732-737, July 2016.

Other conventional approaches have considered non-taut-tethered flight using a reactive tether management approach, see, e.g., L. Zikou, C. Papachristos, and A. Tzes, "The power-over-tether system for powering small UAVs: Tethering-line tension control synthesis," in 2015 23rd Mediterranean Conference on Control and Automation (MED), pp. 681-687, June 2015. Adding a tether to a UAV provides the opportunity to measure additional variables (such as the rotational position and velocity of the reel, tether tension, and tether departure angle) which can be used to perform non-GPS-based UAV position estimation. For instance, the tether arrival angle at the UAV can be measured (see, e.g., L. A. Sandino, M. Bejar, K. Kondak, and A. Ollero, "A square-root unscented Kalman filter for attitude and relative position estimation of a tethered unmanned helicopter," in 2015 International Conference on Unmanned Aircraft Systems (ICUAS), pp. 567-576, June 2015) and/or the tension at the UAV estimated (see, e.g., A. Al-Radaideh and L. Sun, "Self-localization of a tethered quadcopter using inertial sensors in a GPS-denied environment," in 2017 International Conference on Unmanned Aircraft Systems (ICUAS), pp. 271-277, June 2017) and incorporated into the state estimation algorithm. Others have used a non-taut catenary cable model for position estimation of the UAV, see, e.g., B. Galea and P. G. Kry, "Tethered flight control of a small quadrotor robot for stippling," in 2017 IEEE/RSJ International Conference on Intelligent Robots and Systems (IROS), pp. 1713-1718 September 2017; S. Kiribayashi, K. Yakushigawa, and K. Nagatani, "Position estimation of tethered micro unmanned aerial vehicle by observing the slack tether," in 2017 IEEE International Symposium on Safety, Security and Rescue Robotics (SSRR), pp. 159-165, October 2017 and A. Borgese, D. C. Guastella, G. Sutera, and G. Muscato, "Tether-based localization for cooperative ground and aerial vehicles," IEEE Robotics and Automation Letters, vol. 7, no. 3, pp. 8162-8169, 2022.

In all the conventional taut-tethered-UAV applications described above, no experimental validation has been performed from a highly dynamic moving base station, i.e., a tethered-UAV mounted on the back of a moving ground vehicle travelling over a rolling road or a small SV in an ocean environment. In such scenarios, a taut tether management approach may eventually cause the UAV's flight controls to saturate which would force an emergency landing. Additionally, a taut tether management approach would be problematic for any sensor payload that requires the UAV to be stationary since the motion of the UAV is coupled with the base station.

In view of the foregoing and for other reasons that will become more clear, there exists a need in the art for improved autonomous hanging tether management systems and methods for UAV-SV teams.

SUMMARY OF THE INVENTION

An embodiment of an autonomous tether management system for maintaining a slack tether between an UAV and a SV is disclosed. The embodiment of the system may include a SV controller mounted to the SV. The system embodiment may further include a SV radio configured for bi-directional communication between the SV and the UAV. The system embodiment may further include a UAV controller including a UAV radio in communication with the SV radio. The system embodiment may further include a winch in communication with and controlled by the SV controller. According to this particular embodiment, the winch may be configured for adjusting length of the tether. The system embodiment may further include the SV controller configured for implementing a method for tether management of the UAV tethered to the SV. According to this particular embodiment, the method may employ a 4th-order reference tether length model.

An embodiment of a method for tether management of an UAV tethered to a SV is disclosed. The embodiment of the method may include obtaining a radial distance and an altitude difference between the UAV and the SV. The embodiment of the method may further include measuring accelerations of the UAV and the SV. The embodiment of the method may further include estimating relative position and relative velocity between the UAV and the SV from the radial distance, the altitude difference and the accelerations of the UAV and the SV. The embodiment of the method may further include calculating a reference tether length from the radial distance and the altitude difference between the UAV and the SV. The embodiment of the method may further include low-pass filtering the reference tether length using a vertical speed-based gain scheduled coefficient. The embodiment of the method may further include measuring actual tether length. The embodiment of the method may further include comparing the actual tether length to the low-pass filtered reference tether length. Finally, the embodiment of the method may further include adjusting actual tether length to match the reference tether length.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless specifically otherwise stated.

Figure 1:
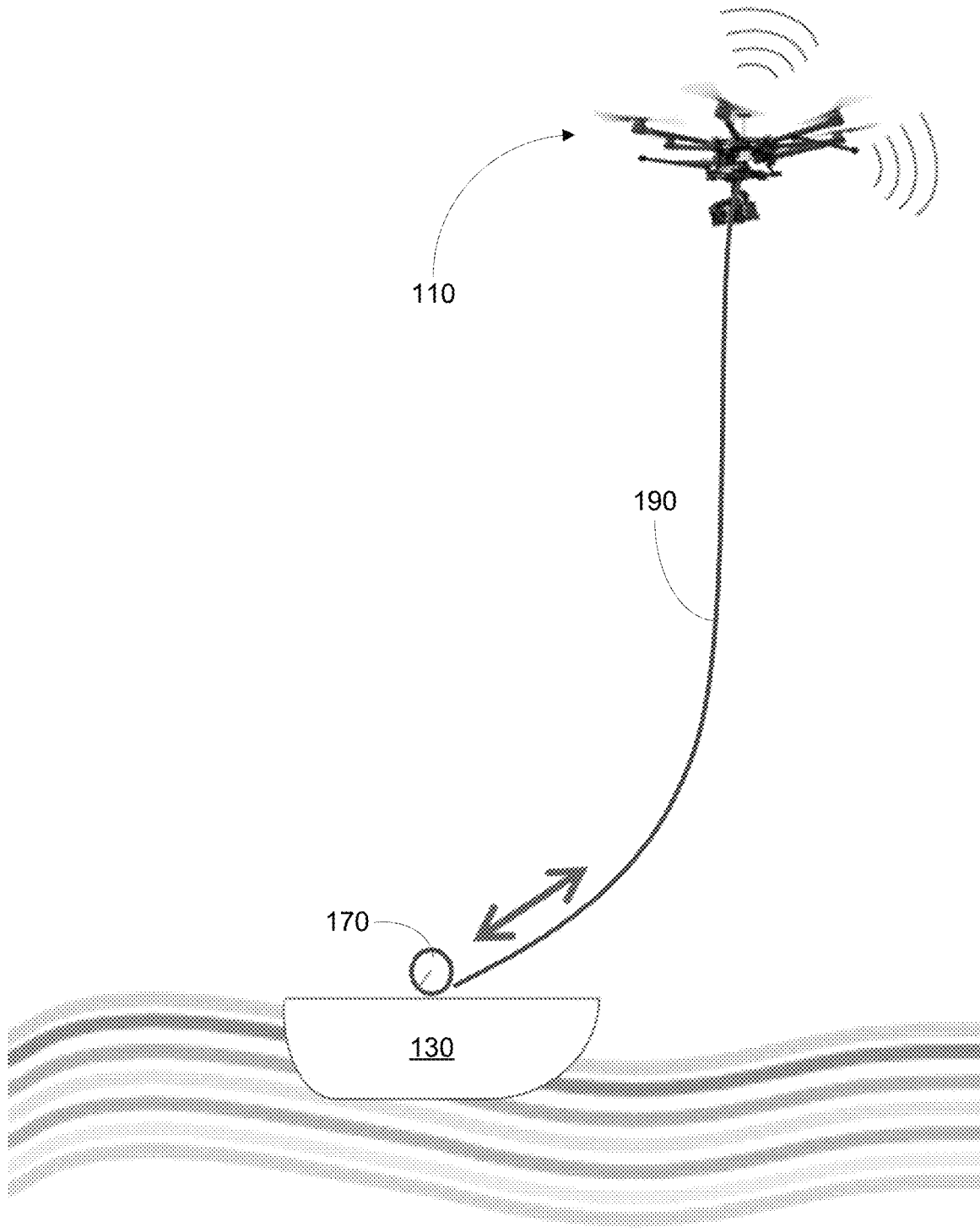
FIG. 1 is a schematic diagram of a tethered UAV-SV team in an ocean environment with waves up to sea state 4 (moderate) on the Douglas sea scale, according to the present invention.

FIG. 1 is a schematic diagram of a tethered UAV-SV team 100 in an ocean environment with waves up to sea state 4 (moderate) on the Douglas sea scale, according to the present invention. As shown in FIG. 1, the UAV 110 is tethered via power umbilical tether 190 to a SV 130 with its associated a winch 170 (also referred to herein as a "winch system", or "reel", or "spool") configured for adjusting length of the tether 190, indicated by the double-headed arrow. The tether 190 provides power from the SV 130 up to the UAV 110 and may also act as a wired radio (data) link down to the SV 130. Current embodiments of the system allow the UAV 110 to fly up to 200+ m altitude while maintaining position, orientation, and altitude for communication during intelligence, surveillance, and reconnaissance (ISR) missions as shown in FIG. 1.

According to particular embodiments, the UAV 110 is tethered 190 to a small (e.g., length of 3 to 7 meters) SV 130. It will be understood that length, size or type (manned/unmanned, ground- or water-based) of the SV 130 is not a limiting factor of the present invention, only that it may undergo dynamic motion. The exemplary water-based SV 130 may be subject to a dynamic ocean environment denoted as non-linear parallel lines in FIG. 1. The system and method used to control the winch 190 and thereby the tether length is the subject of the present invention. Again, it will be understood that the inventive systems and methods disclosed herein are not limited to a SV 130 being a small boat on water as depicted in FIG. 1. Rather, SV 130 may also be a water-based USV, a ground vehicle, e.g., a truck traversing a road or hill, or any other suitable ground-traversing vehicle that may have associated dynamic motion at the winch platform.

The invention disclosed herein is useful for the autonomous tether management of a tethered UAV. A tethered UAV system allows for potentially unlimited flight times. Power to operate the UAV may be supplied up through the tether and data from the UAV may be downloaded through the tether. Management of the tether is the heart of this invention. Important features in this invention include using the relative position (altitude and range) of the winch/base station and the UAV as feedback to control the tether length (or departure angle or tension) to a suitable slack, or hanging tether length. The reference tether length can be determined using a polynomial evaluation of the relative position. Additional important features of this invention include the method of control, leveraging that reference model, performance enhancements and control tools to make the system robust and functional.

A particular design criterion for this invention is to provide a UAV tethered to a small SV which necessitates decoupling of the UAV and SV. The best feasible way to do that, is to fly on a slack, or hanging, non-taut tether, i.e., motion from one does not affect the other and vice versa because of slack in the tether. The terms "hanging", "slack" and "non-taut" are used interchangeably herein. Essentially, the dynamics the SV undergoes (e.g., moving boat on the water) inhibits the taut tether management approach. The tether forces on the UAV for taut tether management approaches will be too large (especially surge forces), and have moments where the UAV's thrust/flight controls become saturated, necessitating either an emergency landing, or a catastrophic failure. The few commercial taut tether systems that have demonstrated maritime tethered UAV operation, have done so from calm waters, with minimal or no dynamic motion at the base SV. Essentially, the taut tether approach necessarily couples the motion of the UAV and the boat, which ultimately limits the environmental conditions (sea state 3 or less on the Douglas sea scale) that the system can operate in. The inventors have developed a novel approach to tether management that eases up on the taut tether requirement, i.e., a "slack tether requirement", and managing the tether length based on the relative position of the UAV and the SV, irrespective of tether tension. By doing so, the inventors proved that slack tether requirement can de-couple the UAV and the SV motion, thereby allowing operation in more challenging sea state/environmental conditions. This improvement in the art of tether management is a hallmark of the present invention.

The inventors approached the challenge of a tethered-UAV system flown from a small ocean-going SV by relaxing the taut tether requirement see, e.g., K. Talke, F. Birchmore, and T. Bewley, "Autonomous hanging tether management and experimentation for an unmanned air-surface vehicle team," Journal of Field Robotics, vol. 39, no. 6, pp. 869-887, 2022, (hereinafter "Talke et al. #1") incorporated herein by reference for all purposes. This technical paper discloses a tether management reference model, controller, and estimator to automatically reel in/out the tether to a desired heave-robustness tether length while preventing the tether from fouling with the SV. Compared to taut-tether UAV operation, the use of a hanging tether was shown to minimize the downforce that the tether applies to the UAV, ultimately decreasing power consumption by the UAV-SV team while maintaining the required margins of safety on the thrust of the UAV. The varying sag of the tether inherently compensates for the fast-acting dynamics of an ocean environment. Flying on a non-taut, or hanging tether, was shown to effectively decouple the motion of the UAV and the SV in lab-based experimentation.

The hanging tether management control approach disclosed herein employs a reference tether length model based on relative positions of the UAV and SV and controlling the tether length using a winch to that reference length. Novel and nonobvious aspects of the present invention are described in K. Talke, F. Birchmore, "Autonomous Hanging Tether Management and Experimentation for a UAV-USV Team: Sea Trials" (hereinafter "Talke et al. #2") IEEE OCEANS 2023 Conference, June 2023, incorporated herein by reference for all purposes.

By using a given a reference tether length model, the system and method embodiments of the present invention can drive the error between the instantaneous tether length and the reference tether length to zero using, e.g., classical control techniques. It will be understood that other control methods may also be employed consistent with the teachings of the present invention. In the exemplary embodiments of the present invention, the classic control technique employed is a proportional-derivative (PD) controller. However, as will become clearer as the solution to this problem is further described herein, there are many aspects which make this problem challenging and its solution nonobvious.

For example, the measurement of relative position is challenging and nonobvious. Using differential global positioning system (dGPS), with a moving baseline, and thus no fixed reference node, one can obtain a relative position estimate between the UAV and winch system at the base of the tether, i.e., mounted to the SV. However, it was unexpected that measurement speed would have a significant impact on system performance. The inventors initially employed a 4 Hz measurement and later upgraded to an 8 Hz measurement. However, even 8 Hz was not fast enough to give good performance on the winch system. Accordingly, a novel Kalman filter is used to fuse together IMU (acceleration) data, to get a 100 Hz estimate of the relative position between the UAV and winch system. In a presently preferred embodiment, the winch controller operates at about 50 Hz to achieve smooth dynamic winch output.

The relative position estimate data feeds into a reference tether length model. Given the measured tether length (spool encoder measurement), an error between the two can be calculated. To obtain the desired tether length, the error is then driven to zero with the PD controller. Additional novel and nonobvious features to make the system run smoothly, namely gain scheduling the PD controller (so the PD controller performed differently when the tether was changing slowly), as well as gain scheduling low-pass filtering on the reference tether model so that the discontinuities in estimation do not propagate through to the winch and tether length adjustments.

There are inherent dGPS errors and Kalman filter errors in altitude estimating (i.e., the altitude estimate tends to have little jumps when there is a correction) that are propagated through to the reference tether length model. These errors would introduce nonlinearities in the error signal. To smooth out those nonlinearities, a low-pass filter may be included in the controller design. However, the inventors made a nonobvious discovery through system testing. They discovered that low-pass filtering was only needed when the boat/base/winch was moving slowing, i.e., changing directions at the top/bottom of a wave cycle. Accordingly, the inventors were able to gain schedule the coefficient of the low-pass filter as an added feature of the present invention. It should be noted that low-pass filtering introduces delay and lag in performance of the system. At slow speeds when changing direction, low-pass filtering is good and helpful by not introducing tether dynamics due to changing direction. However, at high speeds, lag and delay are bad, i.e., resulting in the tether going taut or too slack because the SV and UAV are moving relative to each other. This gain scheduling of the low-pass filter feature in addition to gain scheduling of the PD controller based on the estimated speed, (i.e., the output of the Kalman filter), are at least two of the novel and nonobvious features of the present invention. With this high-level understanding of the usefulness, novelty and nonobviousness of the present invention, further detailed description follows.

Reference Tether Length Model Embodiments—A reference tether length model suitable for use with the present invention could be determined in any number of ways. For example, a relatively simple approach would be to take the hypotenuse (shortest 3D distance between the two points), divide by the altitude to "nondimensionalize it", then add 10%, and multiply by the altitude again. That would give a tether length longer than the shortest, taut tether length. Another approach would be to leverage catenary cable theory to develop a reference tether length model that is robust to heave such as that disclosed in, K. Talke, M. Oliveira, and T. Bewley, "Tether shape analysis for a UAV-USV team," 2018 IEEE International Conference on Intelligent Robots (IROS), Madrid, Spain, pp. 7803-09, Oct. 1-5, 2018.

Figure 2:
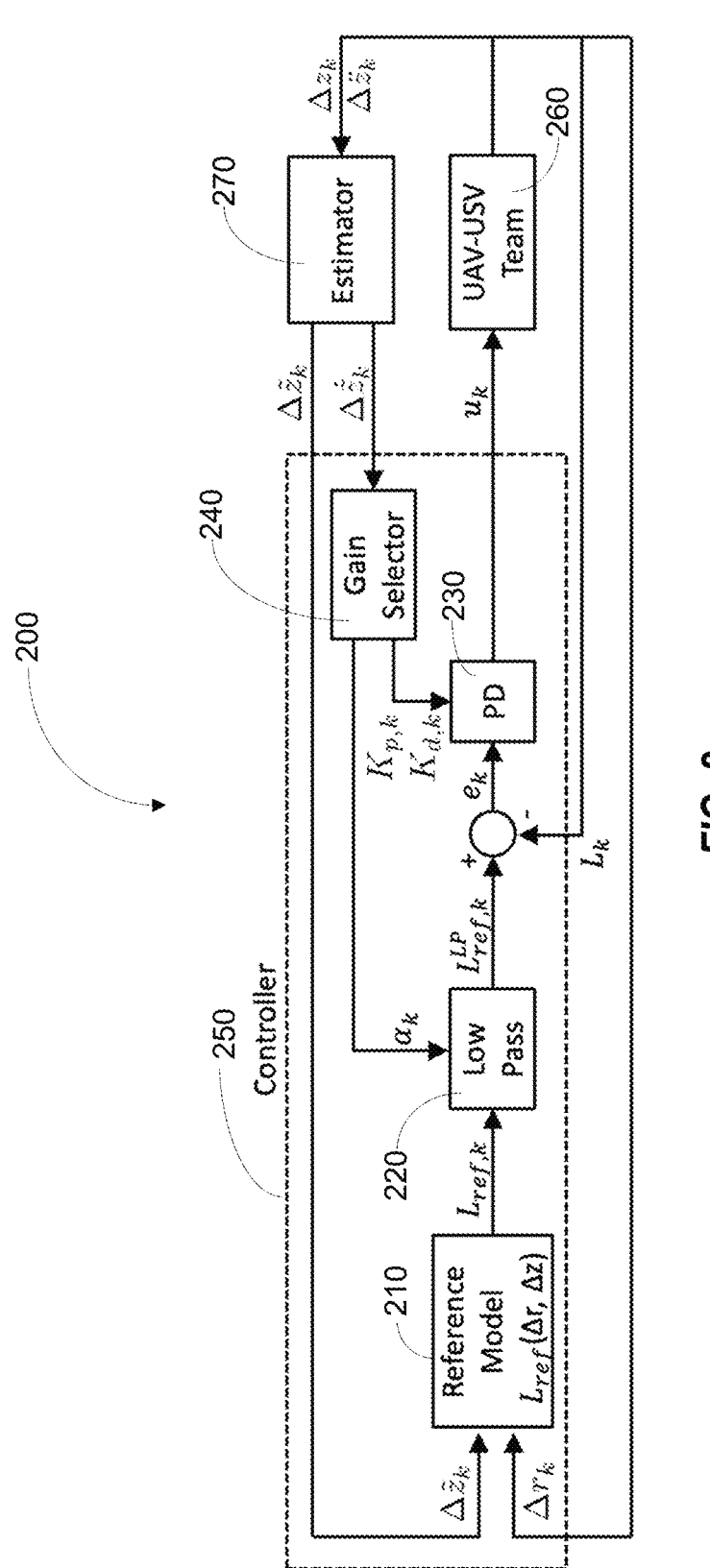
FIG. 2 is a block diagram of an embodiment of a tether management controller used in a tether management system, according to the present invention.

FIG. 2 is a block diagram of an embodiment of a controller 250 (dashed line box) used in a tether management system 200, according to the present invention. Controller 250 may further include a reference tether length model 210 in communication with a low-pass filter 220, which in turn is in communication with PD controller 230 and a gain selector 240 in communication with both the low-pass filter 220 and the PD controller 230. Tether management system 200 may further include the UAV-SV team 260 in communication with an embodiment of a Kalman filter estimator 270. The controller 250 inputs are the estimated relative altitude, $\Delta \tilde{z}_k$, generated by the estimator 270, the estimated relative vertical velocity, $\Delta \dot{z}_k$, also generated by the estimator 270, the measured tether length, $L_k$, from the winch encoder (not shown in FIG. 2, but included in UAV-SV team 260 on the SV and a slow, 4 Hz, relative radial distance measurement, $\Delta r_k$. An error signal, $e_k$, and its derivative, multiplied by the proportional and derivative gains, $K_p$ and $K_d$, respectively, are used to determine the commanded motor voltage, $u_k$, the controller output which drives the motor of the winch on the SV. The gains change depending on the relative velocity between the UAV and SV, with both the gains and velocity thresholds found through experimental testing. The error signal is generated using the difference between the measured tether length, $L_k$, and a gain-scheduled low-pass filtered reference tether length, $$L_{ref,k}^{LP}.$$

The term "radial distance" as used herein refers to conventional Pythagorean distance in two dimensions (2D), not using the altitude dimension, i.e., the square root of the sum of squared x and y distances between two objects, where the z direction is associated with altitude. This is analogous to the shortest 2D distance measured with using only the north and east measurement in the north, east, down (NED) coordinate system used in the global positioning system (GPS).

Reference Tether Length Model—During experimentation leading to the filing of this patent application, the inventors discovered that prior reference tether length models resulted in the tether having too much slack, particularly for relative position ratio, $\Delta r/\Delta z$, or ratio of radial distance to altitude, greater than 3. The relative position ratio, $\Delta r/\Delta z$, is used to nondimensionalize the embodiment of a reference tether length model disclosed herein. So, the inventors performed empirical analysis for $\Delta r/\Delta z$ up to 10 in order to identify regions where different coefficient sets, $f_1$-$f_5$, would apply. The non-dimensionalization and curve-fit resulted in the following novel and nonobvious 4th-order polynomial tether reference length model 210 which was used for all outdoor sea trials conducted by the inventors:

$$L_{ref} = \Delta z \left( f_1 + f_2 \frac{\Delta r}{\Delta z} + f_3 \frac{\Delta r^2}{\Delta z^2} + f_4 \frac{\Delta r^3}{\Delta z^3} + f_5 \frac{\Delta r^4}{\Delta z^4} \right) \quad \text{(Eq. 1)}$$

The curve-fit is gain-scheduled with coefficients $f_1=0.9931$, $f_2=0.1825$, $f_3=0.4132$, $f_4=-0.1160$, and $f_5=0.0134$, and for $\Delta r/\Delta z<2.7$, and $f_1=0.7023$, $f_2=0.6736$, $f_3=0.0784$, $f_4=-0.0095$, and $f_5=0.0005$ for $\Delta r/\Delta z>3.3$. A linear combination of the two coefficient sets was used in the region of $2.7 \leq \Delta r/\Delta z \geq 3.3$. By measuring the radial distance between the winch, the UAV, and the UAV altitude, a tether length that is robust to heave can be determined. The reference tether length model, $L_{ref}$, shown in Eq. 1, with its coefficient sets over the above-stated regions of the relative position ratio, $\Delta r/\Delta z$, is a presently preferred reference tether length model and represents a significant improvement in the art.

Low-Pass Filtering—Referring again to FIG. 2, an embodiment of the low-pass filter 220 may be a first order discrete-time filter defined as:

$$L_{ref,k}^{LP} = (1-\alpha)L_{ref,k-1}^{LP} + \alpha L_{ref,k} \quad \text{(Eq. 2)}$$

where $\alpha \in [0,1]$ is the filter smoothing factor and scheduled depending on how fast the relative altitude changes. The intent of the low-pass filter 220 is to smooth out the reference tether length, $L_{ref,k}$, due to any discontinuities in the relative altitude estimate at slow speeds. At high relative velocities, the relative altitude estimate proved experimentally to be smooth, and $\alpha$ was set to 1 to pass through the reference tether length without filtering it. By eliminating filtering at relative high velocities, lag and associated delays are kept to a minimum, thus improving system performance.

Gain Scheduling—The embodiment of gain selector 240 shown in FIG. 2 may be set up similar to an electronic Schmitt trigger, where the threshold for triggering between states changes depending on specific criteria, see, e.g., Schmitt, O. H. (1938) "A thermionic trigger", Journal of Scientific Instruments, 15 (1), 24-26. Determined experimentally, an a value of 0.2 was used when the relative velocity dropped below 0.3 m/s. If the relative velocity dropped below 0.1m/s, the threshold would also drop down to 0.1 m/s. This has the effect of smoothly transitioning to a low-pass filtered reference signal when the relative velocity slows down, but abruptly turning off the filter with increasing relative velocity, allowing for the winch to respond faster without the low-pass filter-induced lag.

Sensing and Estimation Filter—A linear, double-integrator Kalman filter model, shown in Eq. 3, below, was developed in conjunction with the reference model, $L_{ref}$, which is restricted to the altitude degree-of-freedom (DOF) and fuses slow (4 Hz) differential GPS (dGPS) relative position measurements with fast (100 Hz) inertial measurements:

$$\Delta z_{k+1} = \Delta z_k + \Delta t \Delta \dot{z}_k + \omega_{z,k} \quad \omega_z = N\left(0, \sigma_z^2\right) \quad \text{(Eq. 3)}$$
$$\Delta \dot{z}_{k+1} = \Delta \dot{z}_k + \Delta t \Delta \ddot{z}_k + \omega_{\dot{z},k} \quad \omega_{\dot{z}} = N\left(0, \sigma_{\dot{z}}^2\right)$$
$$\Delta \ddot{z}_{k+1} = \Delta \ddot{z}_k + \omega_{\ddot{z},k} \quad \omega_{\ddot{z}} = N\left(0, \sigma_{\ddot{z}}^2\right)$$
$$\mu_{1,k+1} = \mu_k + \omega_{\mu_1,k} \quad \omega_{\mu_1} = N\left(0, \sigma_{\mu_1}^2\right)$$
$$\mu_{2,k+1} = \mu_k + \omega_{\mu_2,k} \quad \omega_{\mu_2} = N\left(0, \sigma_{\mu_2}^2\right)$$

where $\Delta z$, $\Delta \dot{z}$, $\Delta \ddot{z}$, are the relative position, velocity, and acceleration, respectively, $\mu_1$ and $\mu_2$ are the estimated accelerometer biases, and $\Delta t$ is the time step of the Kalman filter estimator 270 running at 100 Hz. All states, $\omega$, are assumed to have zero mean and normally-distributed system noise, N, as noted in Eq. 2, above. The measurement model is defined as:

$$\Delta z_{dGPS,k} = \Delta z_k + v_{z,k} \quad v_z = N\left(0, \sigma_{zdGPS}^2\right) \quad \text{(Eq. 4)}$$
$$\Delta \ddot{z}_{Acc_1,k} = \Delta \ddot{z}_k + \mu_{1,k} + v_{\ddot{z}_1,k} \quad v_{\ddot{z}_1} = N\left(0, \sigma_{Acc_1}^2\right)$$
$$\Delta \ddot{z}_{Acc_2,k} = \Delta \ddot{z}_k + \mu_{2,k} + v_{\ddot{z}_2,k} \quad v_{\ddot{z}_2} = N\left(0, \sigma_{Acc_2}^2\right)$$

where $\Delta z_{dGPS}$ is the dGPS measurement and $\Delta \ddot{z}_{ACC_1}$, and $\Delta z_{ACC_2}$ are the vertical accelerations from two inertial measurement units (IMUs). All measurements are assumed to have zero mean, normally-distributed measurement noise, N. The estimation filter facilitates operations beyond the lab environment, thus allowing for experimental validation outdoors.

Figure 3:
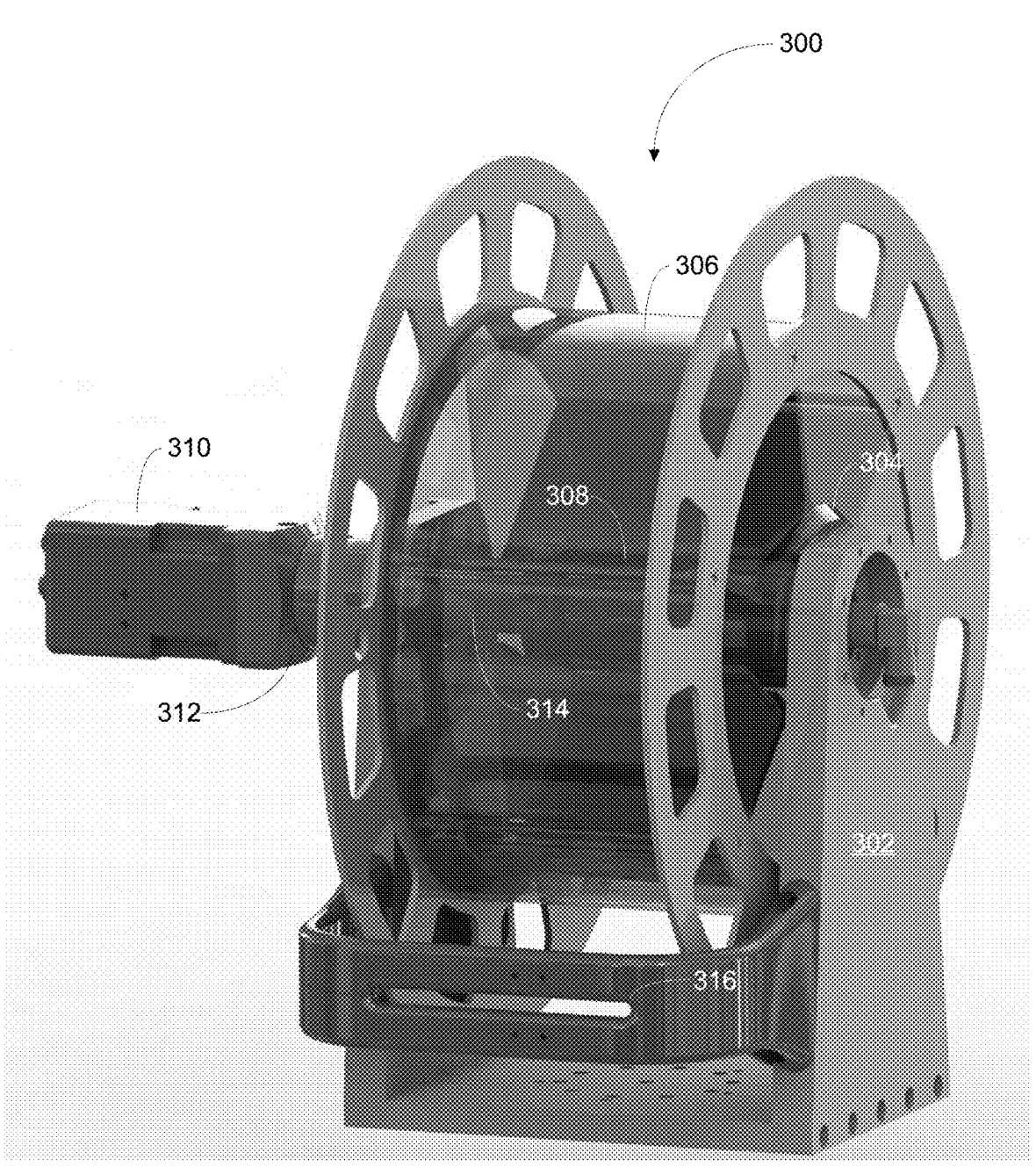
FIG. 3 is an image of an embodiment of a winch, according to the present invention.

Winch System—The winch system disclosed in U.S. Pat. No. 11,440,680 B2 to Talke et al. employed a passive-tether departure angle measurement approach. Although that approach had promise, the embodiment of controller 250 of the present invention is not reliant on this measurement. A redesigned and simplified winch 300 is shown in FIG. 3. As shown in FIG. 3, winch 300 may include a support yolk 302, bearing 304, spool drum 306, slip ring 308, spool motor, encoder and driver 310, gearbox 312, motor shaft coupling 314, and tether guide 316. The key improvements over the prior winch design are a more rigid structure in the support yolk 302, the removal of the passive tether departure measurement capability, in favor of a fixed tether exit channel in the tether guide 316.

Figure 4A:
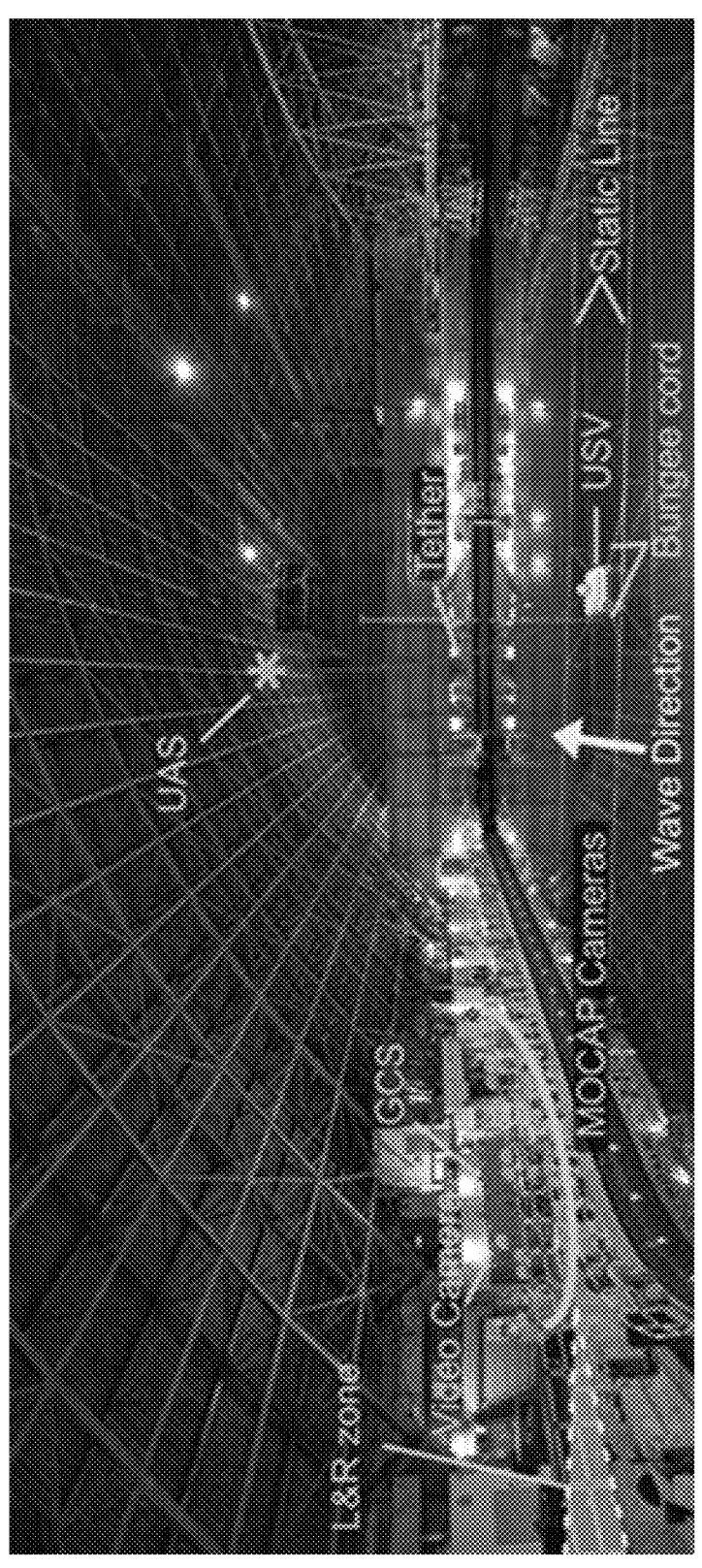
FIGS. 4A and 4B are front and side view annotated images, respectively, of indoor testing setup for a prototype autonomous hanging tether management system for a UAV-SV team, according to the present invention.
Figure 4B:
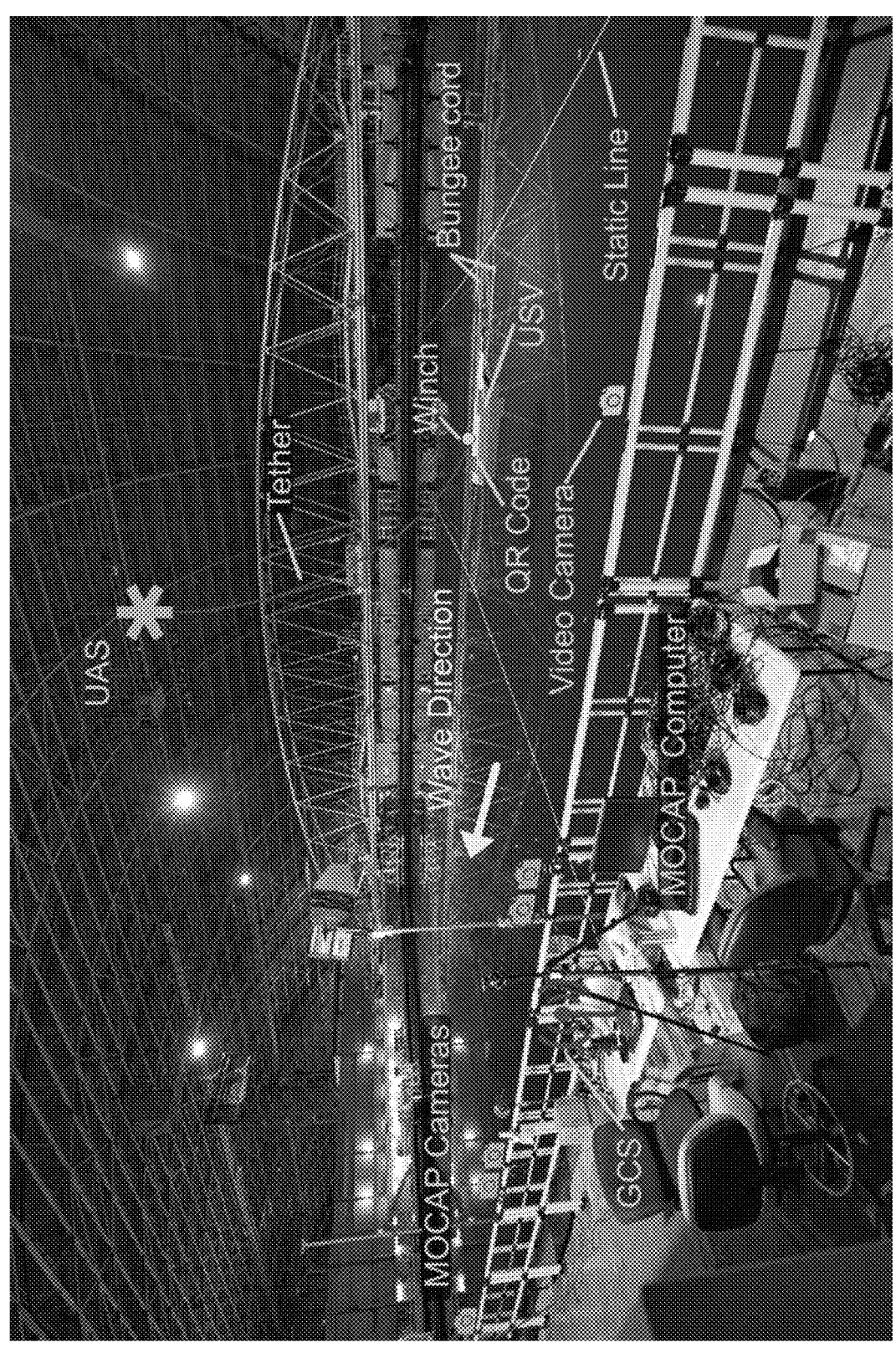

Indoor Wave-Pool Testing—FIGS. 4A and 4B are front and side view annotated images, respectively, of indoor wave-pool testing setup for a prototype autonomous hanging tether management system for a UAV-SV team, according to the present invention. FIGS. 4A and 4B illustrate a surrogate UAV (UAS) tethered to a winch mounted on the surface vehicle (in this instance, an USV on the water). The winch of the present invention, underwent experimental validation at the Maritime and Seakeeping (MASK) Basin at Naval Surface Warfare Center (NSWC) Carderock. The MASK facility has a 110 m by 73 m indoor wave-pool with the capability of generating waves of up to 1.5 m at a 4-second period, and a 30 m high bay over the test section for flying a UAV. The MASK wave-maker is equipped with 216 individually-controlled paddles along the short and long edges of the basin, while the opposing edges feature concrete beaches that absorb at least 92% of the wave energy.

Indoor Wave-Pool Results—A surrogate UAV (UAS) was used in wave-pool experimentation to tune the Kalman filter for on-water use. Using this tuned filter, nine separate UAV flights successfully validated the slack tether management approach in varying head-on wave heights up to 1.0 m as well as two trials of random period irregular wave heights of 0.6 m. The trials were performed using alternating feedback methods for relative position: first using ground-truth motion capture feedback and then using Kalman filter feedback with derated ground-truth to replicate the dGPS sensor at 4 Hz. The experiments showed robustness to the heave and pitch motions of the SV, effectively decoupling its motion from that of the UAV. The resulting effect is an increased payload capacity and altitude limits for the UAV. In addition to successfully demonstrating the ability to manage a slack tether, reflective markers were added to the tether to generate a unique UAV-tether-SV dynamic motion dataset. This data will be used to validate tether dynamic simulation models in ongoing system development. Further description of the indoor wave-pool testing and results follows.

The winch system 300 was mounted to a small 4 m boat which was held in-position by two sets of guide lines. After launching the surrogate UAV (UAS) from shore, the tether management system was activated, and the wave-maker generated head-on waves up to 1.5 m. A motion capture system (MOCAP Cameras and Computer) was setup on shore and streamed the position data of markers on the vessel, surrogate UAV (UAS), and tether at a frequency of 100 Hz with a measurement error of less than 0.2 mm.

The surrogate UAV (UAS) was mounted to a catwalk 20 m above the surface of the water. Eight separate experiments with waves ranging from flat water up to 1.0 m were conducted using feedback from the motion capture system. The data from those experiments was then used as a ground-truth cost metric for tuning the Kalman filter gains using the twiddle algorithm as described in Talke et al. #1. Following these eight experiments, nine separate UAV trials successfully validated the slack tether management approach in varying head-on wave heights of 1.0 m—as well as two trials of random period irregular wave heights of 0.6 m. The trials were performed using alternating feedback methods for position: first using ground-truth motion capture feedback and then Kalman filter feedback using the de-rated ground-truth to replicate the dGPS sensor at 4 Hz.

Figure 5:
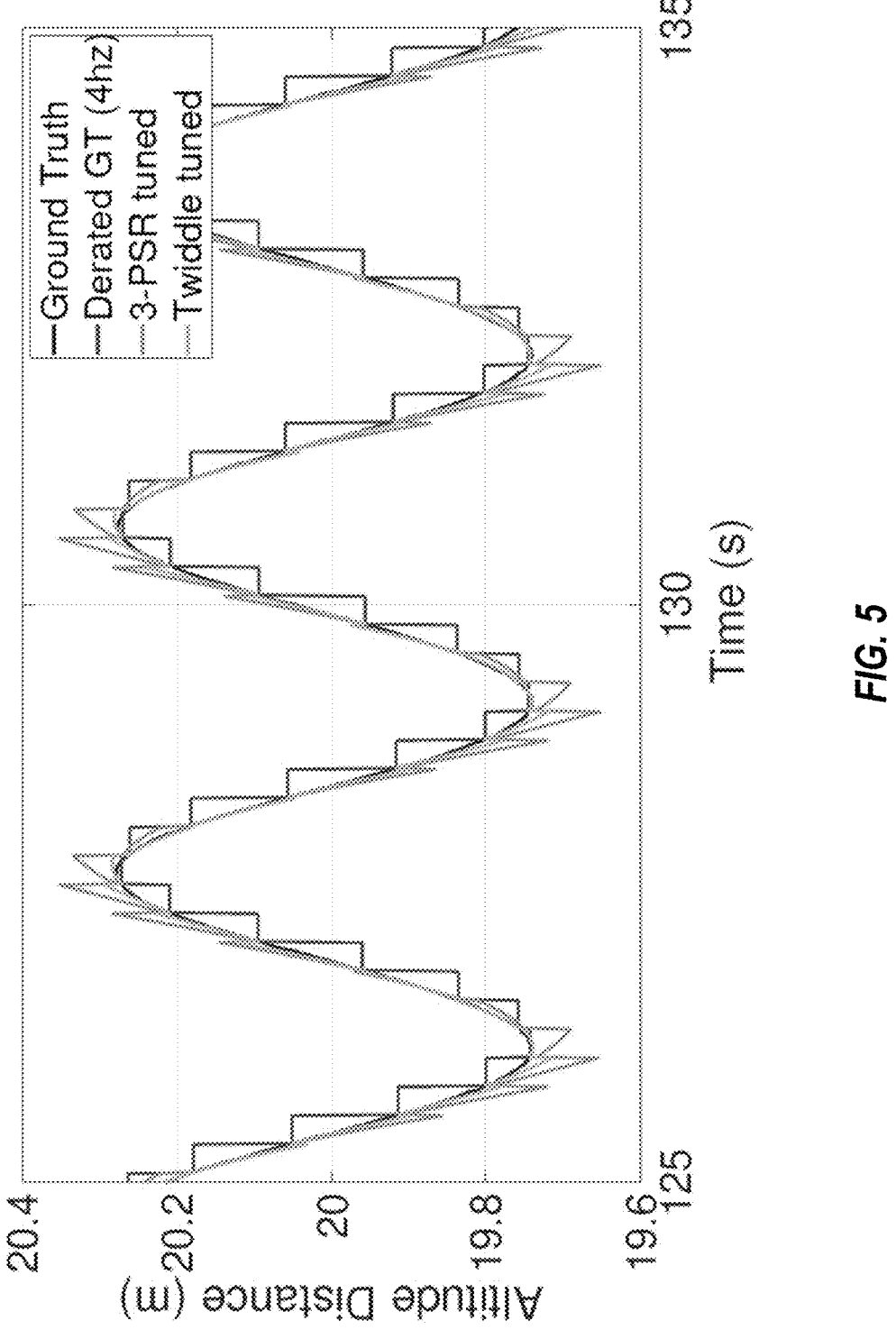
FIG. 5 is a graph illustrating estimation filter tuning results measured during periodic wave motion, according to the present invention.
Figure 6:
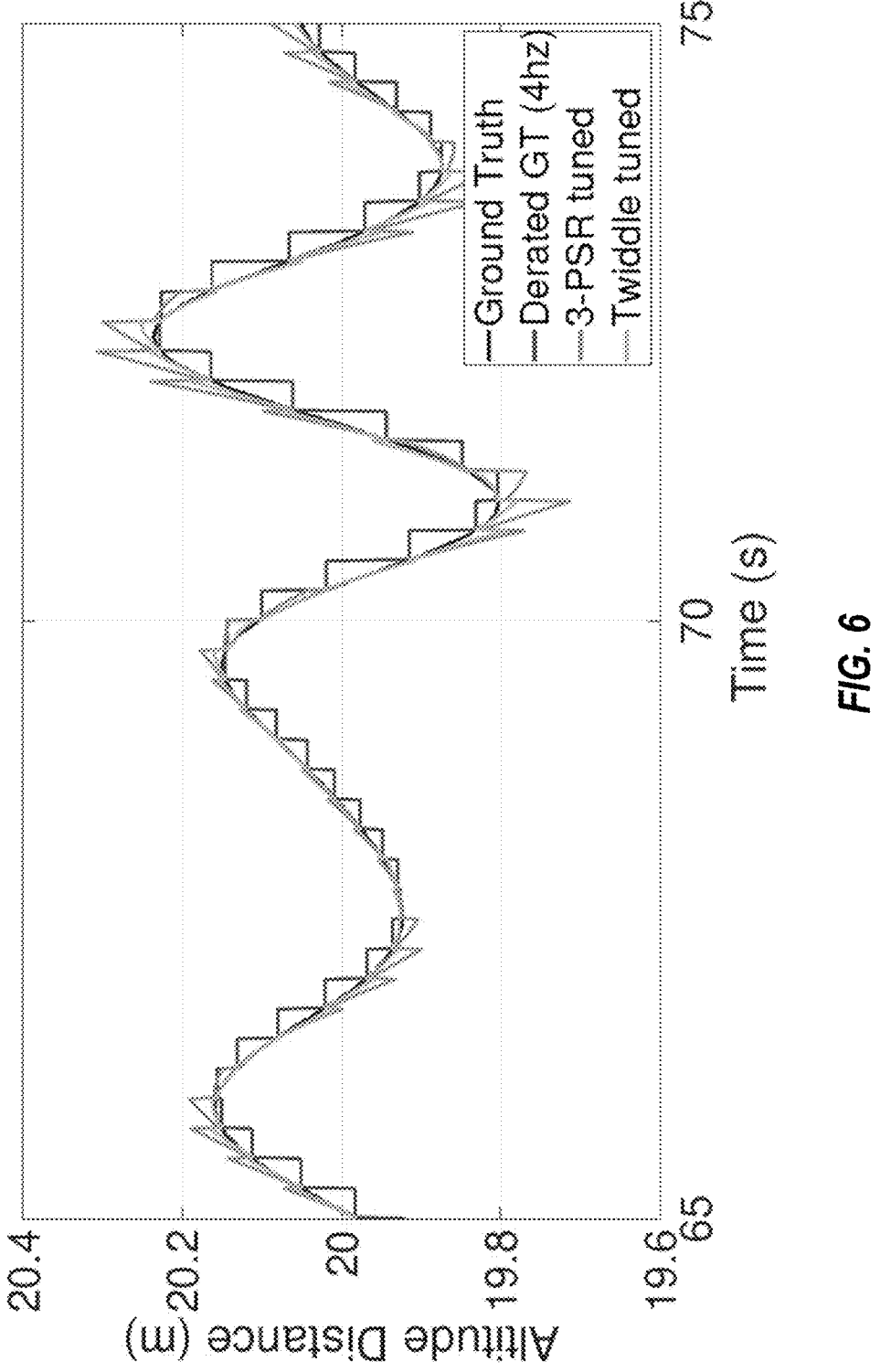
FIG. 6 is a graph illustrating estimation filter tuning results measured during random excitation wave motion, according to the present invention.

Surrogate UAV (UAS) Testing—Using the twiddle algorithm as defined in Talke et al. #1, standard deviation gains for the filter were tuned to $\sigma_{\dot{z}}=0.0025585$, $\sigma_{\ddot{z}}=1.2157e{-}07$, $\sigma_{z}=0.77844$, $\sigma_{\mu_1}=8.0619e{-}07$, $$\sigma_{\mu_2} = 2.1881e{-}08, \sigma_{\Delta \ddot{z}_{Acc_1}} = 326.11, \sigma_{\Delta \ddot{z}_{Acc_2}} = 93.507,$$

and when a relative position measurement exists, $\sigma_{\Delta z_{dGPS}}=0.01$, otherwise $\sigma_{\Delta z_{dGPS}}=$infinity. A typical result for one of the periodic wave profiles is shown in FIG. 5. More particularly, FIG. 5 is a graph illustrating estimation filter tuning results measured during periodic wave motion, according to the present invention. FIG. 5 illustrates the improvement of the tuned Kalman filter, namely the reduced overshoot of the Twiddle tuned filter (teal color) vs. the 3-PSR tuned filter (green color with jagged overshoot). Less overshoot provides better performance. The filter properly fills in the gaps between the de-rated motion-capture (MO-CAP) measurements. Noticeably, the filter using the values tuned previously for the wave replication mechanism (3-PSR) performed poorly with significant overshoot at each change in direction. This was expected as the on-water experimentation has no actuator and resonance noise from the wave replication mechanism the inventors used previously to tune the filter for lab-based testing. Similar results can be seen in FIG. 6, which shows the results for an irregular wave. More particularly, FIG. 6 is a graph illustrating estimation filter tuning results measured during random excitation wave motion, according to the present invention.

Quantitatively, with the exception of flat water, the improvement in the filter is clearly seen in the mean error and root mean square error (RMSE) shown in Table I, below. The newly-tuned filter performed nearly three times better than the filter tuned to the 3-PSR wave replication mechanism—minimizing the estimation error. While it would be ideal for the filter to perform equally well for flat water, this limitation is acceptable as perfectly-flat water is an extremely unlikely operating condition to exist in an actual deployment scenario. However, it will be understood that the filter could also be tuned for flat water with gain scheduling according other embodiments.

TABLE I

| | | | |
|---|---|---|---|
| Estimation Filter Error | | | |
| Parameter | Flat Water | Periodic Waves | Irregular Waves |
| Test Time (s) | 811.2 | 2044.3 | 129.9 |
| $\Delta \ddot{z}$ |Error| (m) | 0.0024 | 0.0055 | 0.0031 |
| $\Delta \ddot{z}$ RMSE (m) | 0.0035 | 0.0098 | 0.0049 |
| $\Delta \ddot{z}_{PSR}$ |Error| (m) | 0.0013 | 0.0187 | 0.0088 |
| $\Delta \ddot{z}_{PSR}$ RMSE (m) | 0.0017 | 0.0252 | 0.0143 |

Figure 7:
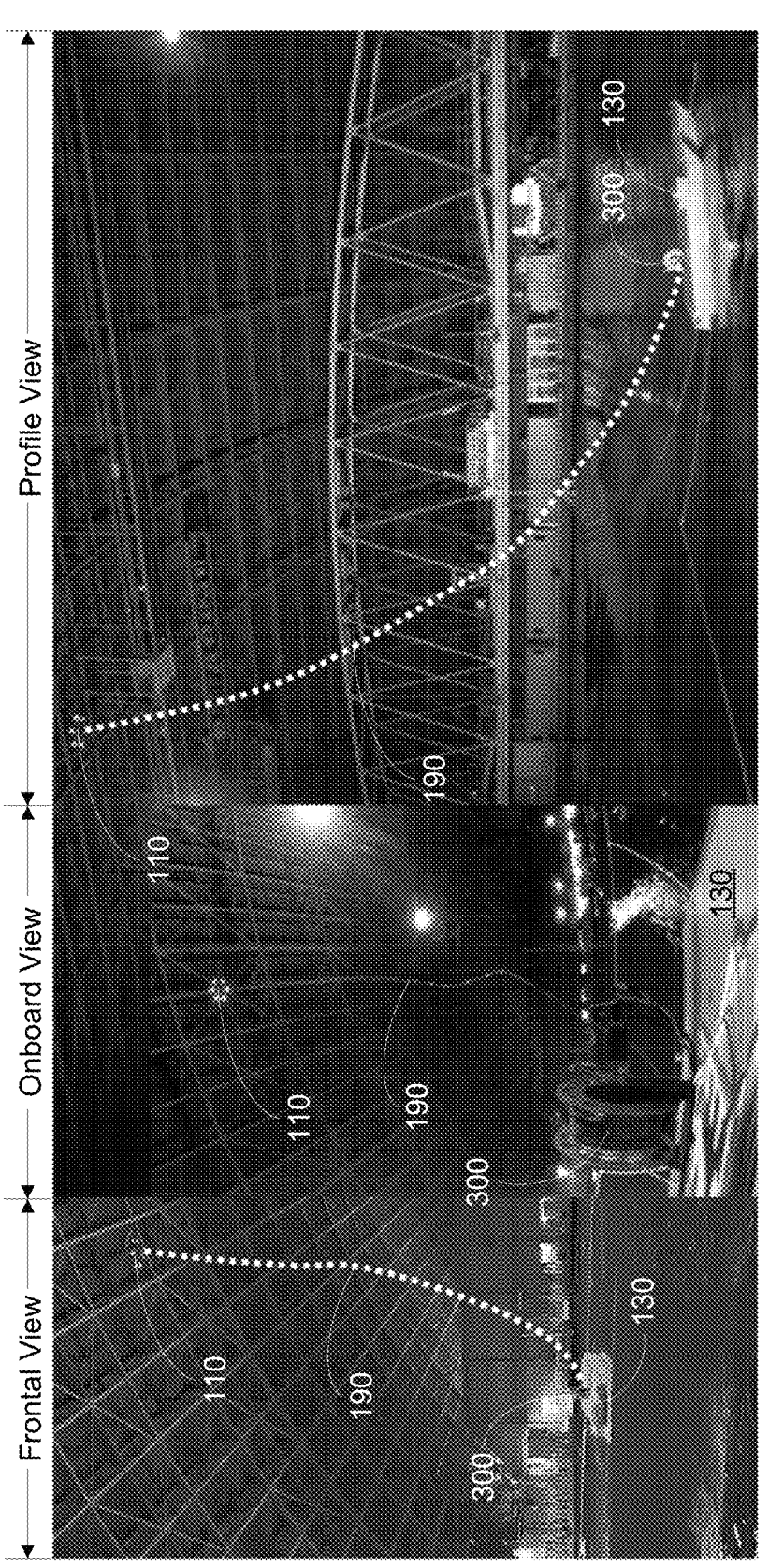
FIG. 7 is a composite annotated images illustrating frontal, onboard and profile views, respectively, of indoor testing setup for a prototype autonomous hanging tether management system for a UAV-SV team, according to the present invention.

UAV Flight Testing—Following the re-tuning of the estimation filter, 11 separate UAV flight testing trials successfully validated the slack-hanging tether management approach in head-on waves. FIG. 7 is composite annotated images illustrating frontal, onboard and profile views, respectively, of indoor testing setup for a prototype autonomous hanging tether management system for a UAV-SV team, according to the present invention. The various views shown in FIG. 7 illustrate a UAV 110 tethered 190 to a SV 130 with associated winch 300 on water in the MASK facility. The catenary model-based control performed well with the tether generally retaining the shape of a catenary curve throughout the wave motion profile.

Figure 8:
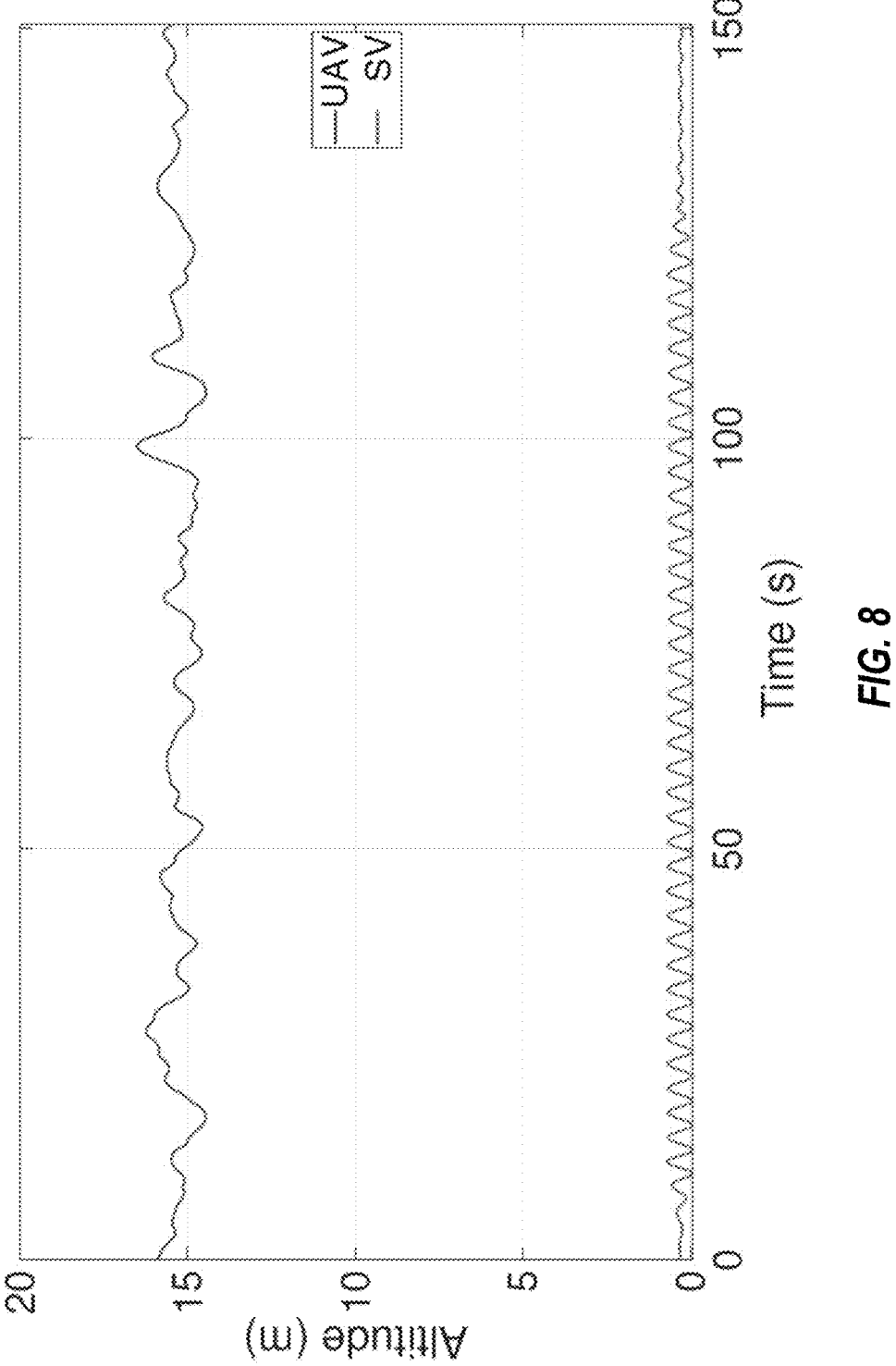
FIG. 8 is a graph illustrating altitude measurements for both a UAV and SV during typical indoor testing of a prototype autonomous hanging tether management system for a UAV-SV team, according to the present invention.

FIG. 8 is a graph illustrating altitude measurements for both a UAV and SV during typical indoor testing of a prototype autonomous hanging tether management system for a UAV-SV team, according to the present invention. As shown in FIG. 8, the UAV has significantly more altitude variation than the SV due to the fact that the UAV was flown via remote control (RC) from shore without any position-holding controller. Noticeably, the periodicity of the wave (SV motion) does not show up in the UAV's motion, as would be expected in a taut tether management scenario.

Figure 9:
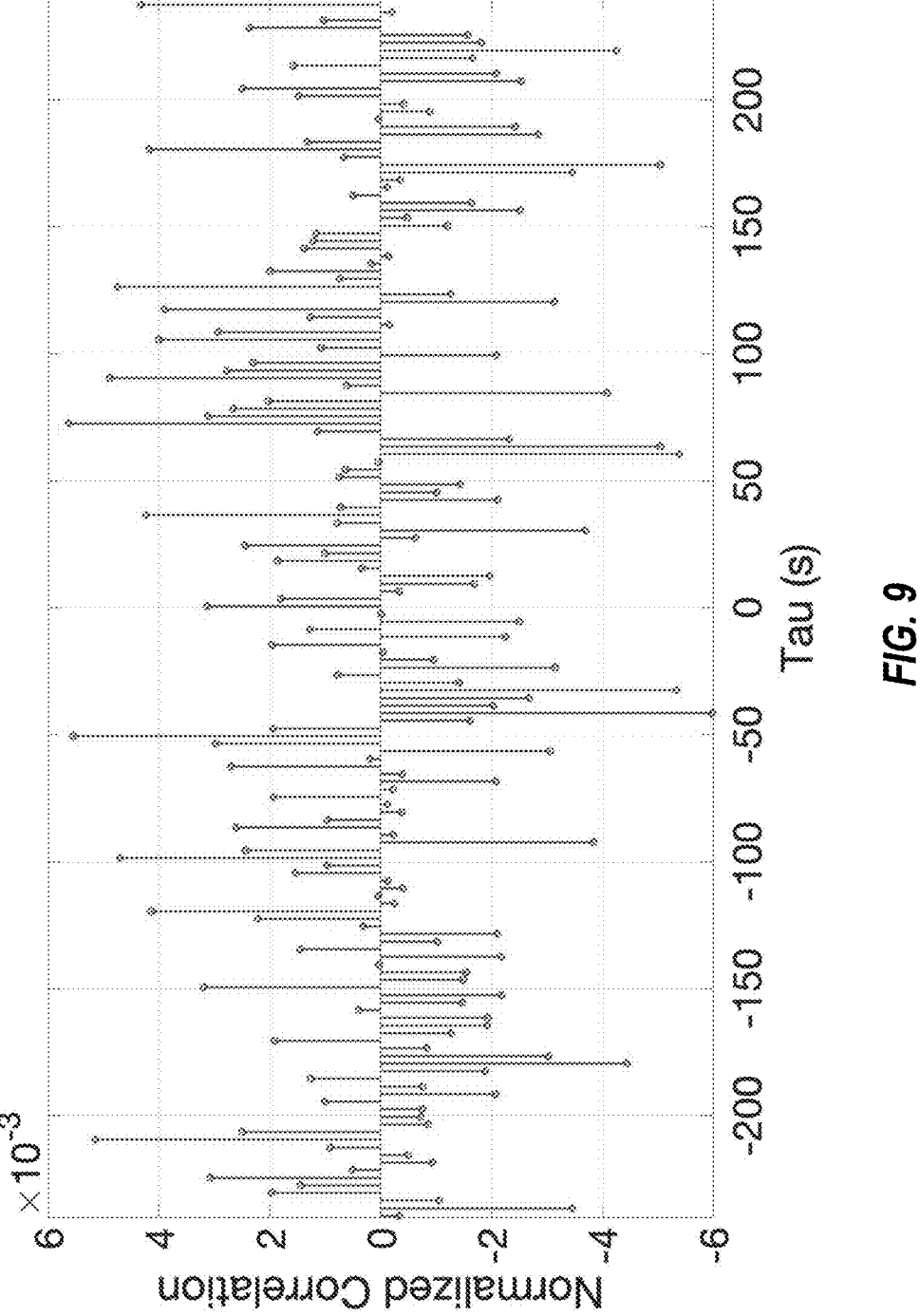
FIG. 9 is graph illustrating normalized cross-correlation between UAV altitude and winch platform height, according to the present invention.

To further demonstrate the decoupling of the UAV and SV motion, the normalized cross-correlation of the UAV and winch altitude for a typical trial is shown in FIG. 9. More particularly, FIG. 9 is graph illustrating normalized cross-correlation between UAV altitude and winch platform height, according to the present invention. The amplitude of the cross-correlation is relatively flat for all time shifts-under a normalized 0.01. If the tether were pulling on the UAV, a peak near zero lag would be expected. This decoupling result was typical for both pure motion capture feedback as well as Kalman filter-based feedback. One of the key takeaways of this experimentation is the three-dimensional (3-D) dynamic motion datasets of the UAV, the SV and winch, and the tether nodes. This dataset will serve as a valuable resource for further validating 3-D dynamic tether simulation models currently under development.

Figure 10:
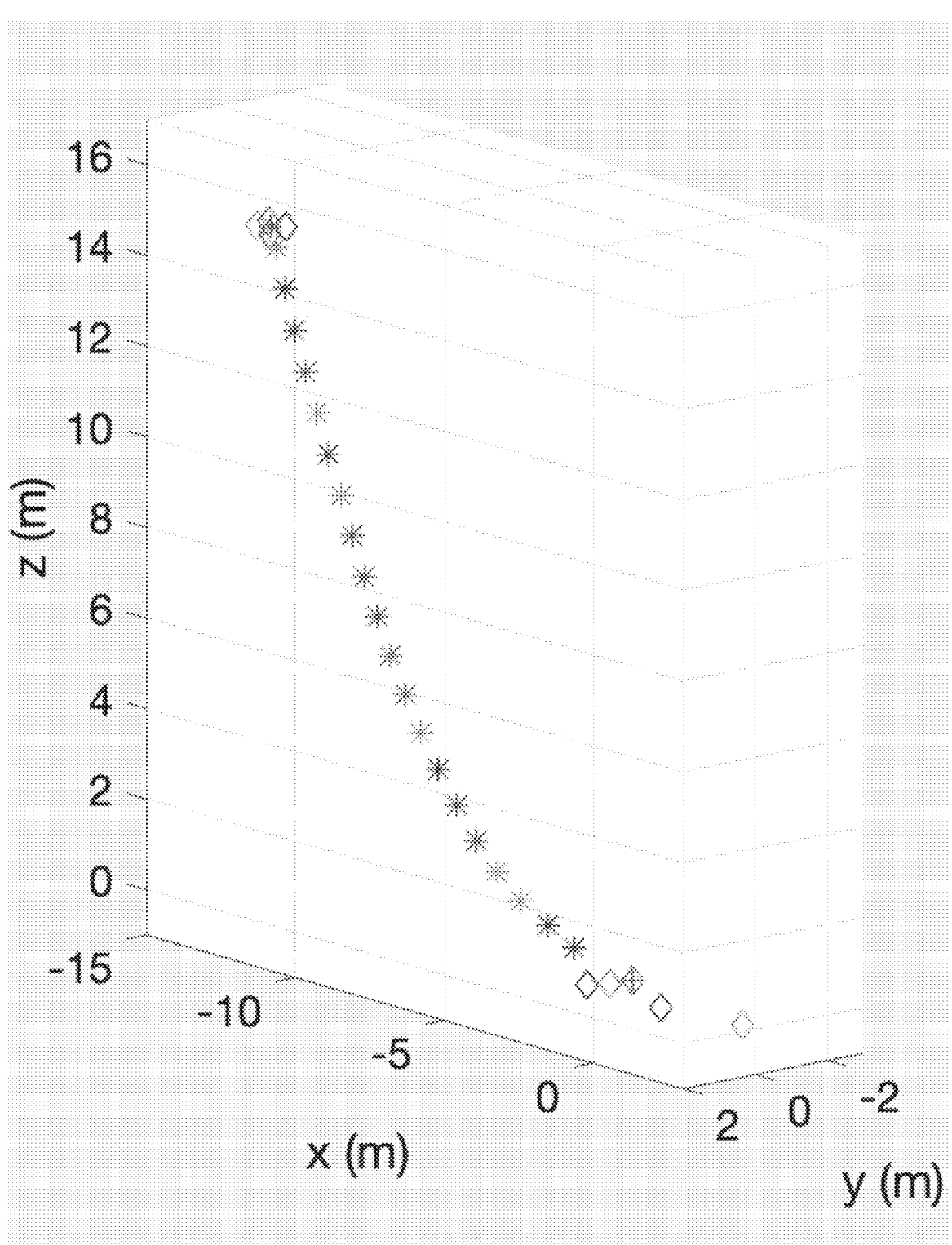
FIG. 10 is a graph illustrating an example of a typical 3D motion capture dataset as a function of x, y, z coordinates with the UAV defined by four points, the SV and winch defined by five points and 20 tether markers visible, according to the present invention.
Figure 11:
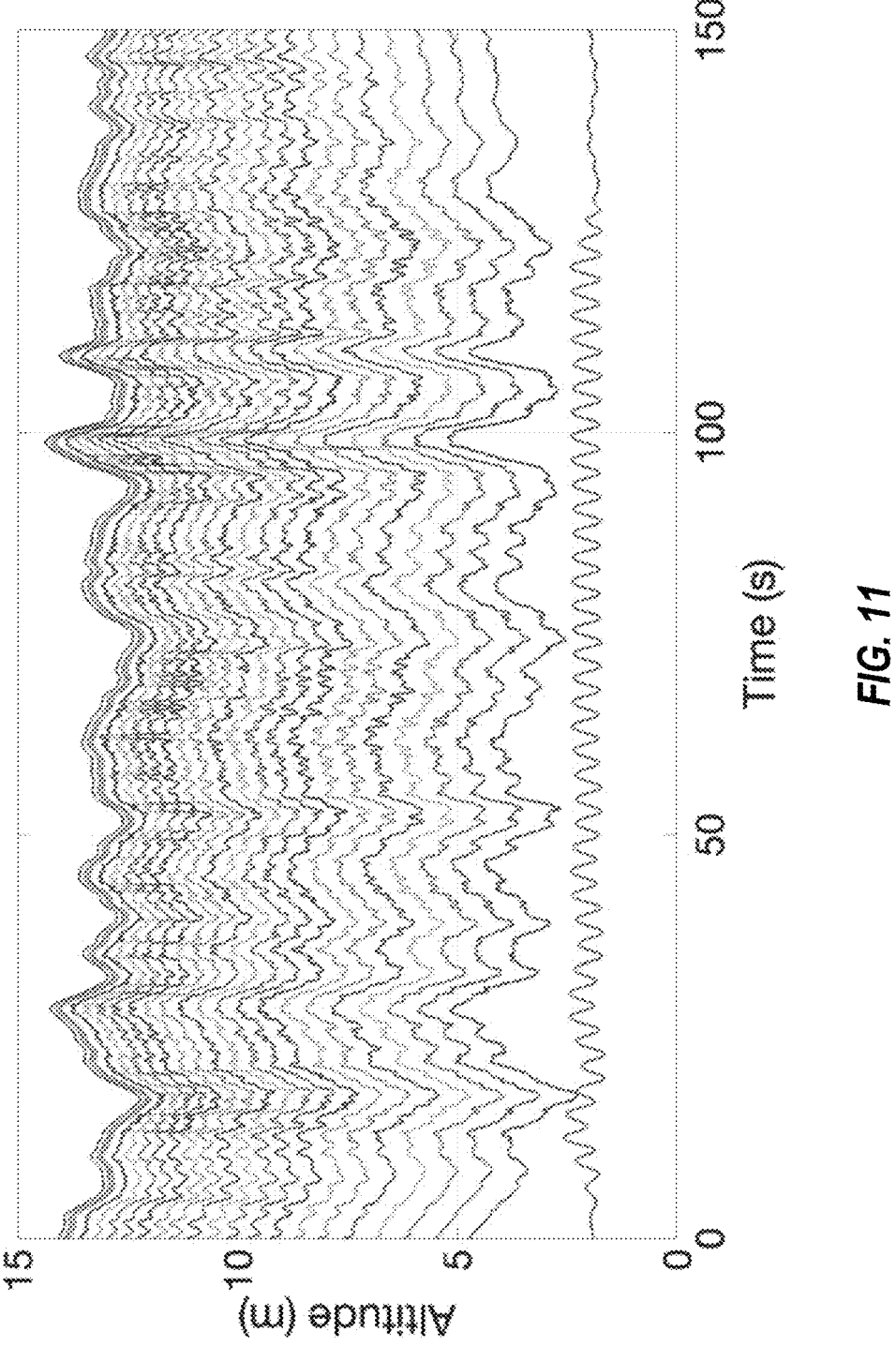
FIG. 11 is a graph illustrating an example of a motion capture dataset displaying the time series altitude of the 20 tether markers, the UAV and the winch, according to the present invention.

A 3-D plot from a typical experiment is shown in FIG. 10 and a time series plot of the altitude for all the motion tracker markers is shown in FIG. 11. More particularly, FIG. 10 is a graph illustrating an example of a typical 3D motion capture dataset as a function of x, y, z coordinates with the UAV defined by four points, the SV and winch defined by five points and 20 tether markers visible, according to the present invention. Also more particularly, FIG. 11 is a graph illustrating an example of a motion capture dataset displaying the time series altitude of the 20 tether markers, the UAV and the winch, according to the present invention.

Figure 12:
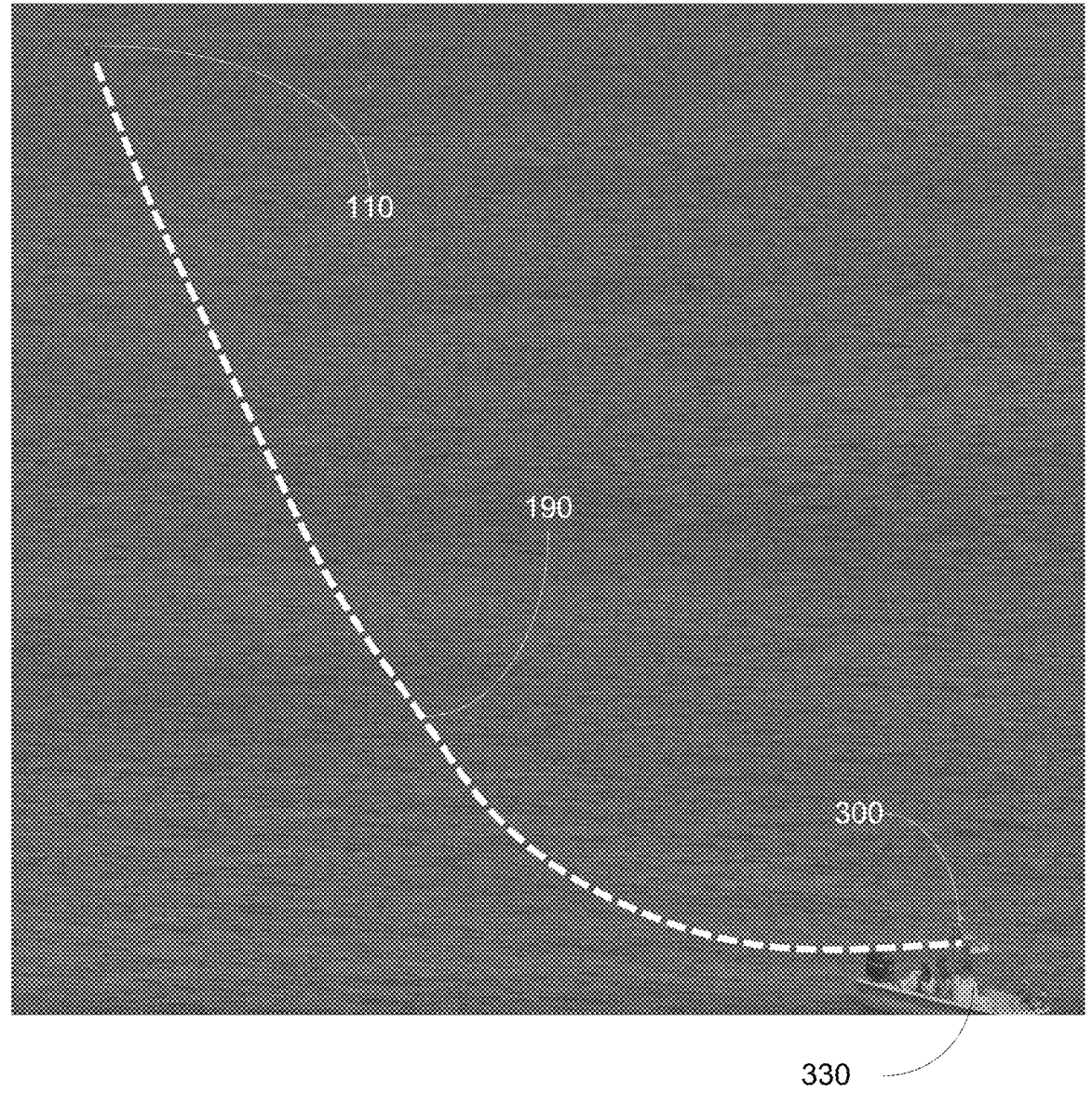
FIG. 12 is a perspective annotated image of a typical outdoor sea trial using a Boston Whaler at anchor (SV) in sea state 3 illustrating a UAV, tether and winch in operation, according to the present invention.

Sea Trial Test Setup—FIG. 12 is a perspective annotated image of a typical outdoor sea trial using a Boston Whaler® Guardian 22 boat 330 as a SV at anchor. It will be understood that in an alternative embodiment, the SV could be replaced with an USV. FIG. 12 further illustrates a UAV, tether and winch in operation, according to the present invention. Three separate 30-minute flight sea trials were conducted with the SV 330 anchored at Ballast Point, located just outside San Diego Bay, in sea state 3 (with waves up to 1.0 m and wind up to 15 knots). The waves varied from on-beam to aft as the boat rotated around the anchor. FIG. 12 shows a profile view of the sea trial testing setup. A waterproof enclosure and the winch system were securely mounted onto the bimini of the 6.5 m Boston Whaler® (SV 330). The UAV was launched by hand from the boat, flown a short distance to the boat's beam, and then the tether management system was activated. The UAV 110, piloted via remote control (RC), maintained an altitude of approximately 25 m with a relative position ratio of $1 \le \Delta r / \Delta z \le 2$.

Sea Trial Test Results—Because the outdoor sea trials had no ground-truth to compare to, the criteria for success is more qualitative than quantitative. Throughout the three sea trials, there were no missed dGPS messages indicating that the hardware and software systems were working well. The tether 190 was kept in a catenary shape with sufficient slack to prevent it from pulling on the UAV 110 but not so much slack as to become fouled by the boat (SV 330), anchor, or sea surface.

Figure 13:
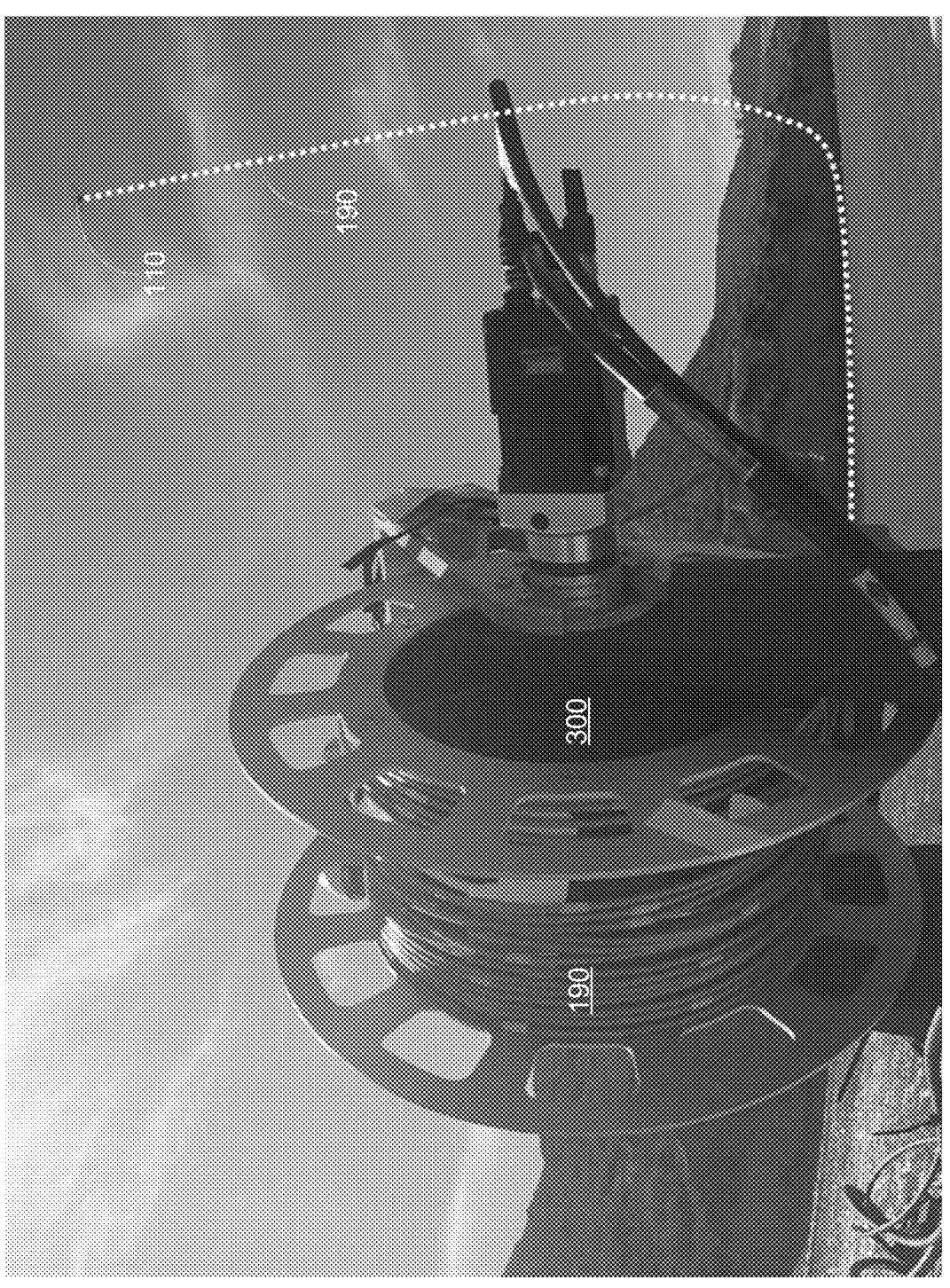
FIG. 13 is an onboard perspective image of a winch, tether and UAV during sea trials, according to the present invention.
Figure 14:
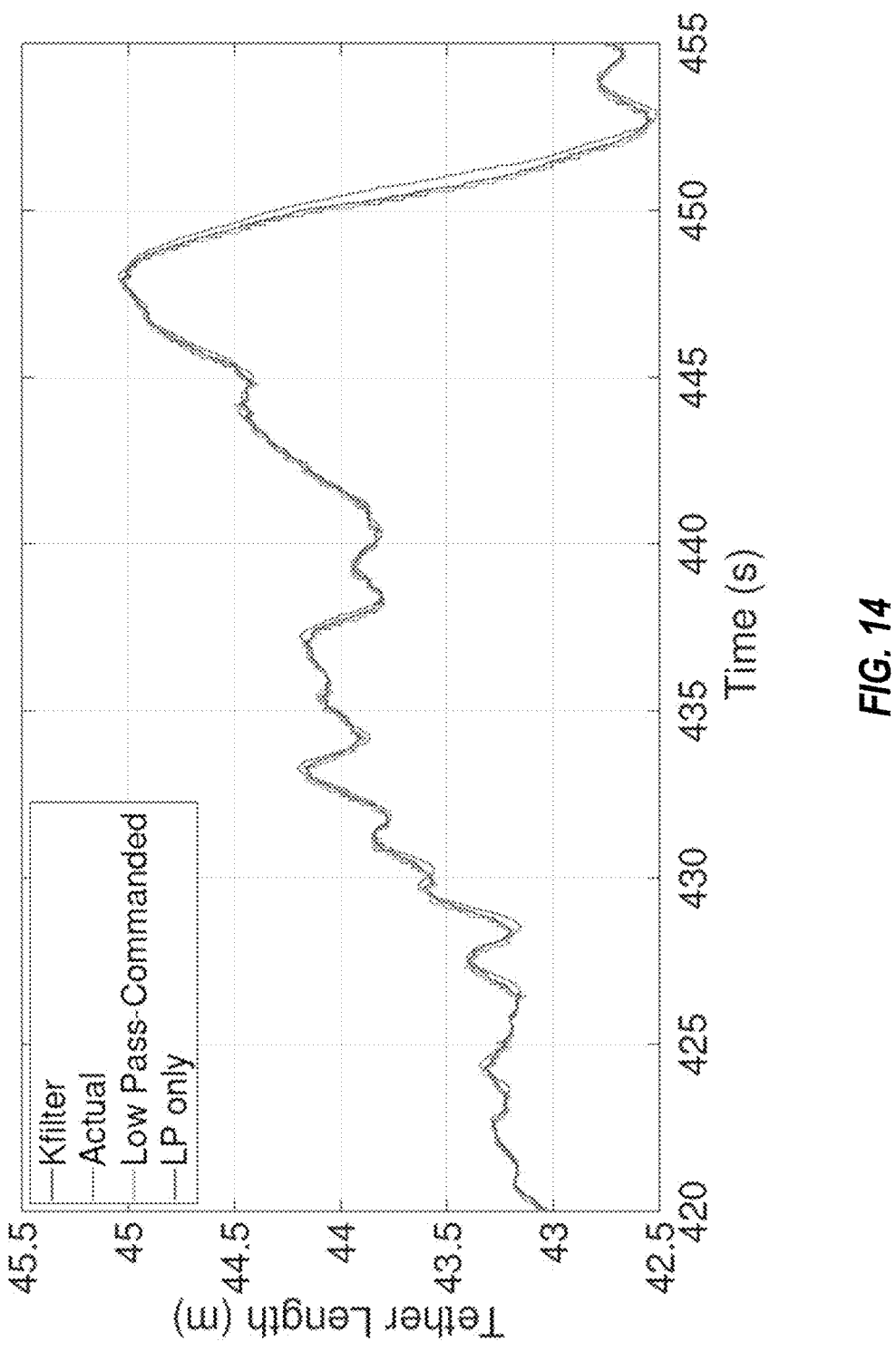
FIG. 14 is a graph illustrating tether length results for various embodiments of an autonomous hanging tether management system for a UAV-SV team, according to the present invention.

FIG. 13 is an onboard perspective image of a winch 300, tether 190 and UAV 110 during sea trials, according to the present invention. As shown in FIG. 13, the tether 190, highlighted in white dots for visibility away from the winch 300, has a clear catenary shape as anticipated for the desired slack condition. FIG. 14 is a graph illustrating tether length results for various embodiments of an autonomous hanging tether management system for a UAV-SV team, according to the present invention. The controller 250 (FIG. 2) performed as desired, properly switching between the purely Kalman filter-based tether reference length and the low-passed reference length. The performance of the tether management system 200 (FIG. 2) was as desired and the experimentation was a success.

Figure 15:
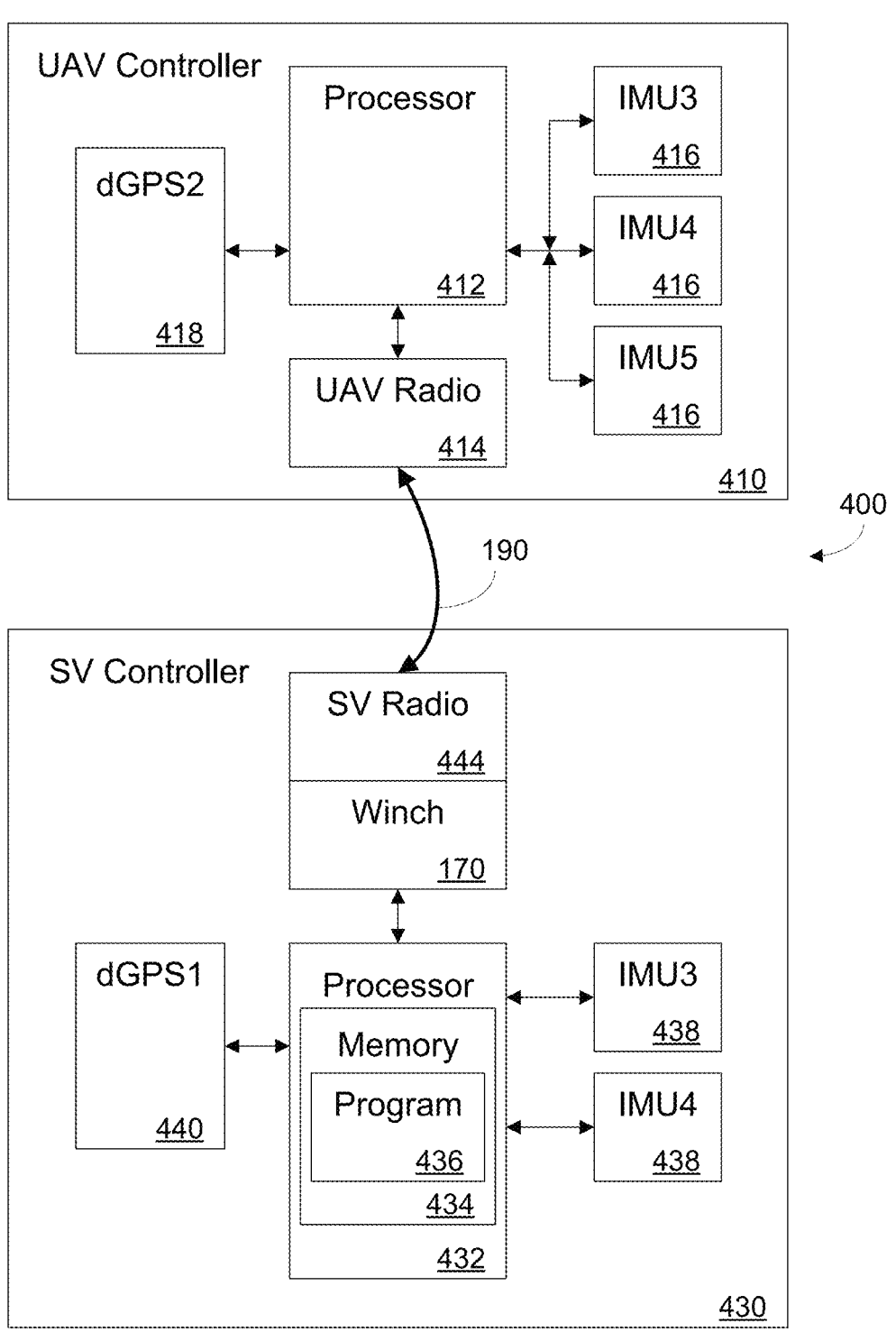
FIG. 15 is a block diagram of an embodiment of an autonomous hanging tether management system for a UAV-SV team, according to the present invention.

FIG. 15 is a block diagram of an embodiment of an autonomous hanging tether management system 400 for a UAV-SV team, according to the present invention. As shown in FIG. 15, UAV controller 410 is in communication with SV controller 430 via tether 190. It will be understood that UAV controller is configured to be mounted to the UAV 110 (not shown in FIG. 15, but see FIG. 1). It will be further understood that SV controller 430 is configured to be mounted to SV 130 (also not shown in FIG. 15, but see FIG. 1). As further shown in FIG. 15, UAV controller 410 may include a processor 412 in communication with a radio 414. According to a particular embodiment, UAV radio 414 may be wired radio for transmitting and receiving data via tether 190. UAV controller 410 may further include at least one IMU 416 (three shown) also in communication with the processor 412. UAV controller 410 may further include at least one dGPS2 418 (one shown) also in communication with processor 412.

As further shown in FIG. 15, SV controller 430 may include a processor 432 in communication with memory 434. Memory 434 may be configured to store data received from various sensors as well as a computer program 436 configured to execute computer instructions to implement one or more methods of the present invention. SV controller 430 may further be configured with one or more IMUs 438 (two shown) in communication with processor 432. SV controller 430 may further be configured with at least one dGPS1 440 (one shown) also in communication with processor 432. SV controller 430 may further be configured with an embodiment of a winch 170 and a SV radio 444, both in communication with processor 432. According to a particular embodiment, SV radio 444 may be a wired radio configured for communication with another wired radio on the UAV (UAV radio 414) Tether 190 may be physically connected between the UAV controller 410 and winch 170 on the SV controller 430. UAV controller 410 receives power via tether 190 from SV controller 430. UAV controller 410 communicates with SV controller 430 via respective wired radios 414 and 444 through tether 190. According to a particular embodiment, dGPS1 440 may communicate directly with dGPS2 418 via a separate channel on wired radio 414 and 444 communications link to reduce latency and complexity of the system 400. By doing so, dGPS1 can the correct relative position data more quickly.

Figure 16:
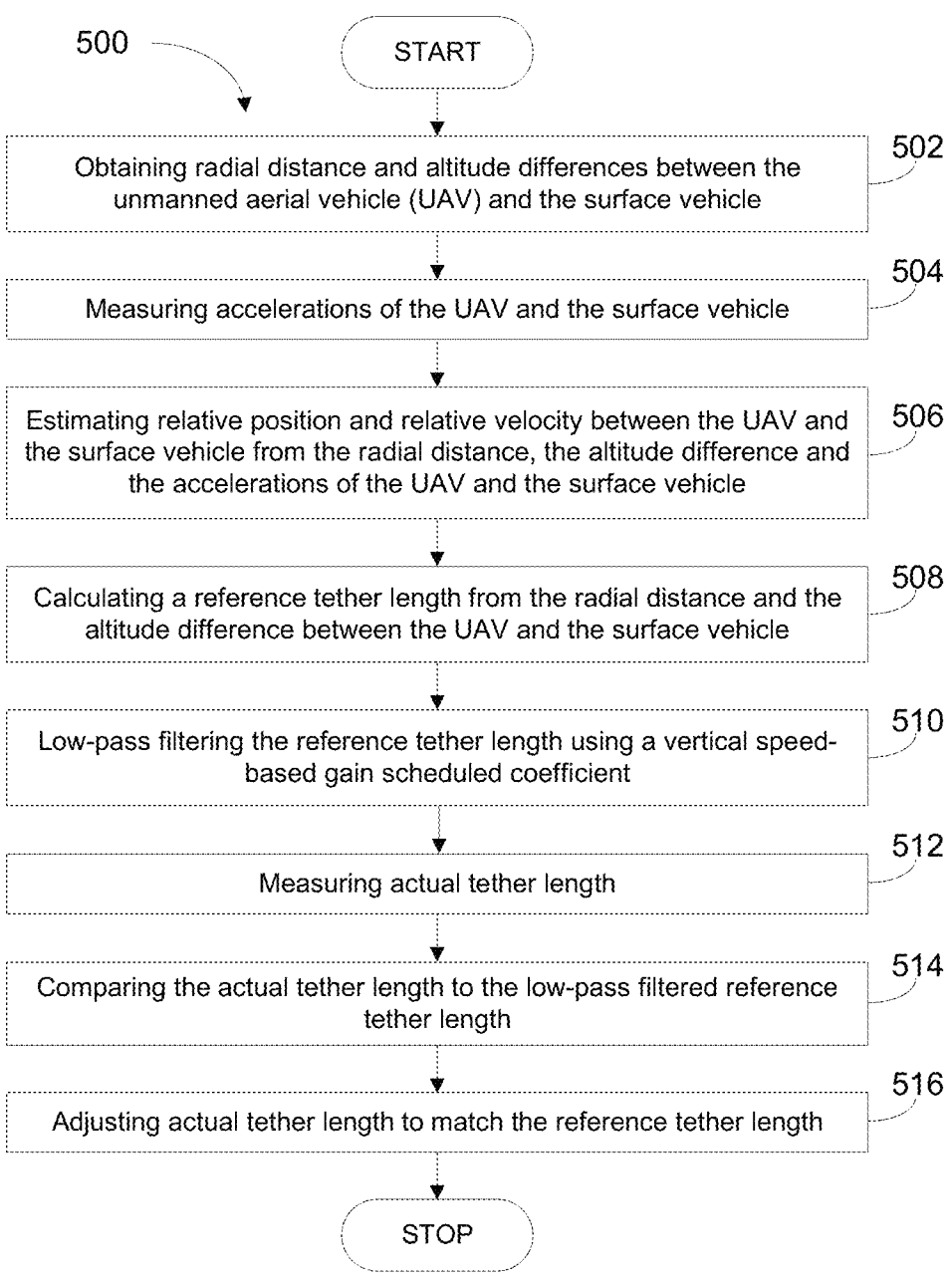
FIG. 16 is a flowchart of an embodiment of a method for hanging tether management of an UAV tethered to an SV.

FIG. 16 is a flowchart of an embodiment of a method 500 for tether management of an UAV tethered to a SV. Method 500 may include obtaining 502 a radial distance and an altitude difference between the UAV and the SV. Method 500 may further include measuring 504 accelerations of the UAV and the SV. Method 500 may further include estimating 506 relative position and relative velocity between the UAV and the SV from the radial distance, the altitude difference and the accelerations of the UAV and the SV. Method 500 may further include calculating 508 a reference tether length from the radial distance and the altitude difference between the UAV and the SV. Method 500 may further include low-pass filtering 510 the reference tether length using a vertical speed-based gain scheduled coefficient. Method 500 may further include measuring 512 actual tether length. Method 500 may further include comparing 514 the actual tether length to the low-pass filtered reference tether length. Method 500 may further include adjusting 516 actual tether length to match the reference tether length.

Having described a general method 500 embodiment for tether management of an UAV tethered to a SV, particular method embodiments for tether management of an UAV tethered to a SV follow. According to a particular embodiment of method 500, the radial distance and the altitude difference may be obtained from at least one dGPS mounted to the UAV and the SV. According to another embodiment of method 500, measuring the accelerations of the UAV and the SV may be performed using at least one dGPS and at least one IMU. According to a couple particular embodiments of method 500, calculating the reference tether length may include inputting the radial distance and the altitude difference into either a $3^{rd}$-order, or a $4^{th}$-order, reference tether length model. A particular embodiment of a $3^{rd}$-order reference tether model is disclosed in Eq. (4) in Talke et al. #1. A particular embodiment of a $4^{th}$-order reference tether model is disclosed in Eq. 1 herein. According to still another embodiment of method 500, estimating the relative position and the relative velocity between the UAV and the SV may be performed with a Kalman filter. According to still yet another embodiment of method 500, measuring the actual tether length may be performed by a spool encoder on a winch mounted to the SV and connected to the tether. According to one embodiment of method 500, adjusting the actual tether length may be performed by a PD controller driving a motor on a winch mounted to the SV and connected to the tether. According to another embodiment of method 500, adjusting the actual tether length may be performed by a linear quadratic regulator (LQR) controller. In two embodiments of method 500 the SV may be a boat on water, or a ground vehicle on land. In a third embodiment, the SV may be an USV.

In view of the particular tether management system embodiments 200 and 400 described herein with reference to the drawings, more general embodiments of tether management systems according to the present invention are now disclosed. More particularly, an embodiment of an autonomous tether management system for maintaining a slack tether between an UAV and a SV is disclosed. The embodiment of the system may include a SV controller mounted to the SV. The system embodiment may further include a SV radio configured for bi-directional communication between the SV and the UAV. The system embodiment may further include a UAV controller including a UAV radio in communication with the SV radio. The system embodiment may further include a winch in communication with and controlled by the SV controller. According to this particular embodiment, the winch may be configured for adjusting length of the tether. The system embodiment may further include the SV controller configured for implementing a method for tether management of the UAV tethered to the SV. According to this particular embodiment, the method may employ a 4th-order reference tether length model. For example and not by way of limitation, Eq. 1, herein is an exemplary 4th-order reference tether length model.

According to another system embodiment, the SV controller may further include a first dGPS mounted to the SV, the dGPS configured for providing SV location information. According to a particular embodiment, the SV controller may further include at least one SV IMU mounted to the SV, the at least one SV IMU configured for providing SV angular velocity and SV linear acceleration. According to this particular embodiment, the SV controller may further include a SV processor in communication with the first dGPS, the at least one IMU and the SV radio. According to this particular embodiment, the SV controller may further include a memory in communication with the SV processor configured for storing data and a computer program including computer instructions adapted for execution by the SV processor for implementing the method for hanging tether management.

According to yet another system embodiment, the UAV controller may further include a second dGPS mounted to the UAV configured for providing UAV location information. According to this particular system embodiment, the UAV controller may further include at least one UAV IMU mounted to the UAV and configured for providing UAV angular velocity and UAV linear acceleration. According to this particular system embodiment, the UAV controller may further include a UAV processor in communication with the second dGPS and the at least one UAV IMU. According to this particular embodiment, the UAV processor may be configured to provide the UAV location information, the UAV angular velocity and the UAV linear acceleration to the SV controller. According to still yet another system embodiment, the SV radio and the UAV radio may each be wired radios.

According to one system embodiment, the method for tether management may include obtaining a radial distance and an altitude difference between the UAV and the SV using the first and the second dGPS. According to this particular system embodiment, the method may further include measuring accelerations of the UAV and the SV using the at least one SV IMU and the at least one UAV IMU. According to this particular system embodiment, the method may further include estimating relative position and relative velocity between the UAV and the SV from the radial distance, the altitude difference and the accelerations of the UAV and the SV. According to this particular system embodiment, the method may further include calculating a reference tether length from the radial distance and the altitude difference between the UAV and the SV. According to this particular system embodiment, the method may further include low-pass filtering the reference tether length using a vertical speed-based gain scheduled coefficient. According to this particular system embodiment, the method may further include measuring actual tether length. According to this particular system embodiment, the method may further include comparing the actual tether length to the low-pass filtered reference tether length. According to this particular system embodiment, the method may further include adjusting actual tether length to match the reference tether length.

According to still another system embodiment, the estimating of the relative position and the relative velocity between the UAV and the SV may be performed with a Kalman filter. According to yet another system embodiment, the measuring of the actual tether length may be performed by a spool encoder on a winch mounted to the SV and connected to the tether. According to yet another system embodiment, the adjusting of the actual tether length may be performed by a PD controller driving a motor on a winch mounted to the SV and connected to the tether. According to a more particular system embodiment, the PD controller may be gain scheduled based on the relative vertical velocity between the UAV and the SV.

According to still yet another system embodiment, the adjusting of the actual tether length may be performed by a LQR controller in communication with the winch. According to additional system embodiments, the SV may be a boat on water or a ground vehicle on land. According to another particular system embodiment, the SV may be an USV.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of the autonomous hanging tether management system and method for an unmanned aerial and SV team, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A method for tether management of an unmanned aerial vehicle (UAV) tethered to a surface vehicle (SV), comprising:

obtaining a radial distance and an altitude difference between the UAV and the SV;

measuring accelerations of the UAV and the SV;

estimating relative position and relative velocity between the UAV and the SV from the radial distance, $\Delta r$, the altitude difference, $\Delta z$, and the accelerations of the UAV and the SV;

calculating a reference tether length, $L_{ref}$, from the radial distance and the altitude difference between the UAV and the SV using a $4^{th}$-order reference tether length model:

$$L_{ref} = \Delta z \left( f_1 + f_2 \frac{\Delta r}{\Delta z} + f_3 \frac{\Delta r^2}{\Delta z^2} + 4_3 \frac{\Delta r^3}{\Delta z^3} + f_5 \frac{\Delta r^4}{\Delta z^4} \right).$$

where $f_1$ through, $f_5$ are empirically derived coefficients;

low-pass filtering the reference tether length using a vertical speed-based gain scheduled coefficient;

measuring actual tether length;

comparing the actual tether length to the low-pass filtered reference tether length; and adjusting actual tether length to match the reference tether length.

2. The method according to claim 1, wherein the radial distance and the altitude difference are obtained from at least one differential global positioning system (dGPS) mounted to the UAV and the SV.

3. The method according to claim 1, wherein the measuring of the accelerations of the UAV and the SV is performed using at least one differential global positioning system (dGPS) and at least one inertial measurement unit (IMU).

4. The method according to claim 1, wherein the calculating of the reference tether length comprises inputting the radial distance and the altitude difference into a $4^{th}$-order reference tether length model.

5. The method according to claim 1, wherein the estimating of the relative position and the relative velocity between the UAV and the SV is performed with a Kalman filter.

6. The method according to claim 1, wherein the measuring of the actual tether length is performed by a spool encoder on a winch mounted to the SV and connected to the tether.

7. The method according to claim 1, wherein the adjusting of the actual tether length is performed by a proportional-derivative (PD) controller driving a motor on a winch mounted to the SV and connected to the tether.

8. The method according to claim 1, wherein the adjusting of the actual tether length is performed by a linear quadratic regulator (LQR) controller.

9. The method according to claim 1, wherein the SV is selected from the group consisting of: a boat on water and a ground vehicle on land.

10. The method according to claim 1, wherein the SV comprises an unmanned SV (USV).

11. An autonomous tether management system for maintaining a slack tether between an unmanned aerial vehicle (UAV) and a surface vehicle (SV), comprising:

a SV controller mounted to the SV and including a SV radio configured for bi-directional communication between the SV and the UAV;

a UAV controller including a UAV radio in communication with the SV radio;

a winch in communication with and controlled by the SV controller, the winch configured for adjusting length of the tether; and the SV controller further configured for implementing a method for tether management of the UAV tethered to the SV, the method employing a 4th-order reference tether length model $$L_{ref} = \Delta z \left( f_1 + f_2 \frac{\Delta r}{\Delta z} + f_3 \frac{\Delta r^2}{\Delta z^2} + 4_3 \frac{\Delta r^3}{\Delta z^3} + f_5 \frac{\Delta r^4}{\Delta z^4} \right)$$

where $f_1$ through, $f_5$ are empirically derived coefficients.

12. The system according to claim 11, wherein the SV controller further comprises:

a first differential global positioning system (dGPS) mounted to the SV configured for providing SV location information;

at least one SV inertial measurement unit (IMU) mounted to the SV configured for providing SV angular velocity and SV linear acceleration;

a SV processor in communication with the first dGPS, the at least one IMU and the SV radio; and a memory in communication with the SV processor configured for storing data and a computer program including computer instructions adapted for execution by the SV processor for implementing the method for hanging tether management.

13. The system according to claim 12, wherein the UAV controller further comprises:

a second dGPS mounted to the UAV configured for providing UAV location information;

at least one UAV IMU mounted to the UAV configured for providing UAV angular velocity and UAV linear acceleration; and a UAV processor in communication with the second dGPS and the at least one UAV IMU, the UAV processor configured to provide the UAV location information, the UAV angular velocity and the UAV linear acceleration to the SV controller.

14. The system according to claim 11, wherein the SV radio and the UAV radio each comprise wired radios.

15. The system according to claim 13, wherein the method for tether management, comprises:

obtaining a radial distance and an altitude difference between the UAV and the SV using the first and the second dGPS;

measuring accelerations of the UAV and the SV using the at least one SV IMU and the at least one UAV IMU;

estimating relative position and relative velocity between the UAV and the SV from the radial distance, the altitude difference and the accelerations of the UAV and the SV;

calculating a reference tether length from the radial distance and the altitude difference between the UAV and the SV;

low-pass filtering the reference tether length using a vertical speed-based gain scheduled coefficient;

measuring actual tether length;

comparing the actual tether length to the low-pass filtered reference tether length; and adjusting actual tether length to match the reference tether length.

16. The system according to claim 15, wherein the estimating of the relative position and the relative velocity between the UAV and the SV is performed with a Kalman filter.

17. The system according to claim 15, wherein the measuring of the actual tether length is performed by a spool encoder on a winch mounted to the SV and connected to the tether.

18. The system according to claim 15, wherein the adjusting of the actual tether length is performed by a proportional-derivative (PD) controller driving a motor on a winch mounted to the SV and connected to the tether.

19. The system according to claim 18, wherein the PD controller is gain scheduled based on the relative vertical velocity between the UAV and the SV.

20. The system according to claim 15, wherein the adjusting of the actual tether length is performed by a state-space linear quadratic regulator (LQR) controller in communication with the winch.

21. The system according to claim 11, wherein the SV is selected from the group consisting of: a boat on water and a ground vehicle on land.

22. The system according to claim 11, wherein the SV comprises an unmanned SV (USV).

23. The system according to claim 11, wherein the $4^{th}$-order reference tether length model is replaced with a $3^{rd}$-order reference tether length model.

* * * * *